US011356312B2

(12) United States Patent
Nadal et al.

(10) Patent No.: US 11,356,312 B2
(45) Date of Patent: Jun. 7, 2022

(54) PSEUDO-GUARD INTERVALS INSERTION IN AN FBMC TRANSMITTER

(71) Applicant: INSTITUT MINES TELECOM—IMT ATLANTIQUE—BRETAGNE—PAYS DE LA LOIRE, Brest (FR)

(72) Inventors: Jérémy Nadal, Brest (FR); Charbel Abdel Nour, Brest (FR); Amer Baghdadi, Brest (FR)

(73) Assignee: INSTITUT MINES TELECOM—IMT ATLANTIQUE—BRETAGNE—PAYS DE LA LOIRE, Brest (FR)

( * ) Notice: Subject to any disclaimer, the term of this patent is extended or adjusted under 35 U.S.C. 154(b) by 4 days.

(21) Appl. No.: 16/971,279

(22) PCT Filed: Feb. 28, 2019

(86) PCT No.: PCT/EP2019/055026
§ 371 (c)(1),
(2) Date: Aug. 19, 2020

(87) PCT Pub. No.: WO2019/170519
PCT Pub. Date: Sep. 12, 2019

(65) Prior Publication Data
US 2021/0014094 A1    Jan. 14, 2021

(30) Foreign Application Priority Data
Mar. 8, 2018    (EP) .................................... 18305251

(51) Int. Cl.
*H04L 27/26* (2006.01)
(52) U.S. Cl.
CPC ........ *H04L 27/264* (2013.01); *H04L 27/2605* (2013.01); *H04L 27/2639* (2013.01)

(58) Field of Classification Search
CPC ............... H04L 27/264; H04L 27/2605; H04L 27/2639
See application file for complete search history.

(56) References Cited

U.S. PATENT DOCUMENTS 6,584,068 B1 *  6/2003  Alard .................. H04L 27/2602
                                                                 370/208
7,751,509 B1 *  7/2010  Lehnert ................. H04L 5/0021
                                                                 375/348

(Continued)

FOREIGN PATENT DOCUMENTS

WO    2014124661 A1    8/2014

OTHER PUBLICATIONS

Bellanger, "FS-FBMC: an alternative scheme for filter bank based multicarrier transmission", 2012 5th International Symposium on Communications, Control and Signal Processing, 2012.
(Continued)

*Primary Examiner* — James M Perez
(74) *Attorney, Agent, or Firm* — BakerHostetler

(57) ABSTRACT

A method and device to modulate an FBMC/OQAM signal, the device comprising at least one QAM mapper mapping a binary stream into complex symbols, a first and a second transmission chain. Each chain comprises: a precoder transposing respective sets of symbols into frequency domain real/imaginary samples, a phase rotator applying a phase quadrature keying to said samples, an FBMC modulator to modulate the output of the phase rotator into an FBMC symbol. The device further comprises an adder of the output of the first transmission chain with a delayed output of the second transmission chain, and is configured to insert guard interval sequences into the binary stream or into the symbols processed by the precoders. A corresponding radio communication equipment, computer program and readable medium is provided.

10 Claims, 15 Drawing Sheets

(56) References Cited

U.S. PATENT DOCUMENTS

| | | | |
|---|---|---|---|
| 7,991,091 B2* | 8/2011 | Suzuki | H04L 27/2605 375/348 |
| 8,045,635 B2* | 10/2011 | Ko | H04L 27/2602 341/94 |
| 8,498,350 B2* | 7/2013 | Stern | H04L 27/26265 375/267 |
| 8,743,837 B2* | 6/2014 | van Zelst | H04L 27/2613 370/350 |
| 8,873,655 B2* | 10/2014 | Rao | H04L 27/26265 375/259 |
| 8,891,662 B2* | 11/2014 | Jeong | H04L 5/0051 375/232 |
| 9,313,063 B1* | 4/2016 | Jia | H04L 25/03006 |
| 9,438,460 B2* | 9/2016 | Ling | H04L 27/2636 |
| 9,479,381 B2* | 10/2016 | Siohan | H04L 27/2626 |
| 9,544,171 B2* | 1/2017 | Berardinelli | H04L 27/2607 |
| 9,673,949 B2* | 6/2017 | Kim | H04L 5/0094 |
| 9,942,011 B2* | 4/2018 | Tang | H04L 5/001 |
| 9,948,373 B2* | 4/2018 | Cassiau | H04B 7/046 |
| 10,230,547 B2* | 3/2019 | Nadal | H04L 27/26534 |
| 10,237,110 B2* | 3/2019 | Kim | H04L 27/2692 |
| 10,257,791 B2* | 4/2019 | Hojeij | H04W 72/0446 |
| 10,340,987 B2* | 7/2019 | McCallister | H04B 17/336 |
| 10,382,240 B2* | 8/2019 | Dore | H04L 27/262 |
| 10,396,847 B2* | 8/2019 | Nadal | H04B 1/7102 |
| 10,594,531 B2* | 3/2020 | Baltar | H04L 27/26416 |
| 10,701,685 B2* | 6/2020 | Abdoli | H04L 5/0066 |
| 10,764,106 B2* | 9/2020 | Nakayama | H04L 27/2082 |
| 10,771,297 B2* | 9/2020 | Lin | H04L 27/265 |
| 10,778,491 B2* | 9/2020 | Lahbabi | H04L 27/2627 |
| 10,855,505 B2* | 12/2020 | Nadal | H04L 27/2643 |
| 10,856,172 B2* | 12/2020 | Hojeij | H04W 72/1215 |
| 10,880,145 B2* | 12/2020 | Shattil | H04L 27/2636 |
| 10,979,151 B2* | 4/2021 | Bendlin | H04B 17/318 |
| 10,985,958 B2* | 4/2021 | Sahin | H04L 27/2628 |
| 10,999,115 B2* | 5/2021 | Lanoiselee | H04L 27/26538 |
| 11,070,415 B2* | 7/2021 | Nadal | H04L 25/03159 |
| 2003/0165131 A1* | 9/2003 | Liang | H04L 25/03159 370/335 |
| 2004/0013084 A1* | 1/2004 | Thomas | H04L 27/2607 370/208 |
| 2006/0087961 A1* | 4/2006 | Chang | H04L 27/2607 370/210 |
| 2007/0189404 A1* | 8/2007 | Baum | H04L 27/2613 375/260 |
| 2007/0253496 A1* | 11/2007 | Giannakis | H04L 1/04 375/260 |
| 2008/0043857 A1* | 2/2008 | Ribeiro Dias | H04L 27/2605 375/260 |
| 2008/0056395 A1* | 3/2008 | Brink | H04L 27/2626 375/267 |
| 2009/0046787 A1* | 2/2009 | Uesugi | H04L 25/0232 375/260 |
| 2009/0161804 A1* | 6/2009 | Chrabieh | H04L 27/2649 375/346 |
| 2010/0091904 A1* | 4/2010 | Wang | H04B 7/0669 375/296 |
| 2011/0243268 A1* | 10/2011 | Mashino | H04L 5/0062 375/285 |
| 2013/0003901 A1* | 1/2013 | Kato | H04L 25/03006 375/341 |
| 2013/0177092 A1* | 7/2013 | Cariou | H04L 25/023 375/260 |
| 2014/0153675 A1* | 6/2014 | Dandach | H04L 27/2631 375/340 |
| 2014/0169501 A1* | 6/2014 | Nazarathy | H04B 7/005 375/316 |
| 2014/0192925 A1* | 7/2014 | Li | H04L 27/2614 375/297 |
| 2015/0063507 A1* | 3/2015 | Dore | H04L 25/03159 375/348 |
| 2015/0304146 A1* | 10/2015 | Yang | H04L 27/2631 370/329 |
| 2015/0333944 A1* | 11/2015 | Bae | H04B 17/354 375/296 |
| 2015/0351098 A1* | 12/2015 | Schellmann | H04L 27/0006 370/329 |
| 2015/0365263 A1* | 12/2015 | Zhang | H04L 27/2602 375/295 |
| 2015/0372843 A1* | 12/2015 | Bala | H04L 27/26538 375/295 |
| 2016/0006530 A1* | 1/2016 | Nazarathy | H04L 27/264 398/76 |
| 2016/0006586 A1* | 1/2016 | Berardinelli | H04L 25/03821 375/295 |
| 2016/0080961 A1* | 3/2016 | Kim | H04W 24/08 370/252 |
| 2016/0191218 A1* | 6/2016 | Bala | H04L 5/0007 370/330 |
| 2017/0134203 A1* | 5/2017 | Zhu | H04L 27/2614 |
| 2017/0134204 A1* | 5/2017 | Yun | H04L 27/2636 |
| 2017/0310505 A1* | 10/2017 | Nadal | H04L 25/03821 |
| 2017/0331536 A1* | 11/2017 | Cassiau | H04L 27/26416 |
| 2017/0366222 A1* | 12/2017 | Nadal | H04L 27/2654 |
| 2018/0027507 A1* | 1/2018 | Hojeij | H04W 72/0473 455/522 |
| 2018/0048510 A1* | 2/2018 | Nadal | H04L 27/264 |
| 2018/0083814 A1* | 3/2018 | Dore | H04L 25/03343 |
| 2018/0109410 A1* | 4/2018 | Kim | H04L 27/2613 |
| 2018/0167246 A1* | 6/2018 | Yun | H04L 27/2649 |
| 2018/0176815 A1* | 6/2018 | Hojeij | H04W 72/1226 |
| 2018/0254936 A1* | 9/2018 | Choi | H04L 27/362 |
| 2019/0052500 A1* | 2/2019 | Choi | H04L 27/264 |
| 2019/0173730 A1* | 6/2019 | Nakayama | H04L 27/3405 |
| 2019/0386866 A1* | 12/2019 | Lahbabi | H04L 25/03821 |
| 2020/0235973 A1* | 7/2020 | Wang | H04L 27/2649 |
| 2020/0322196 A1* | 10/2020 | Nadal | H04L 27/265 |
| 2020/0351142 A1* | 11/2020 | Nakayama | H04L 5/005 |
| 2020/0403834 A1* | 12/2020 | Lanoiselee | H04L 27/26414 |
| 2021/0014094 A1* | 1/2021 | Nadal | H04L 27/264 |

OTHER PUBLICATIONS

Nadal, et al., "Low-Complexity Pipelined Architecture for FBMC/OQAM Transmitter", IEEE Transactions on Circuits and Systems II: Express Briefs, vol. 63, No. 1, pp. 19-23, Jan. 2016.

\* cited by examiner

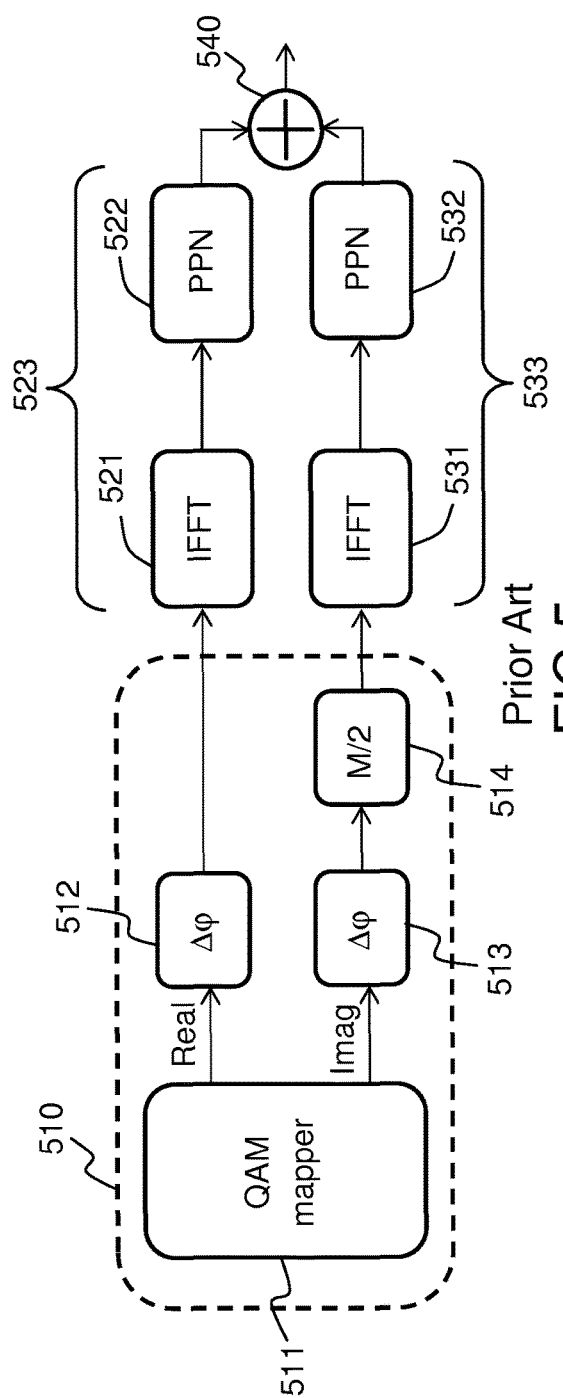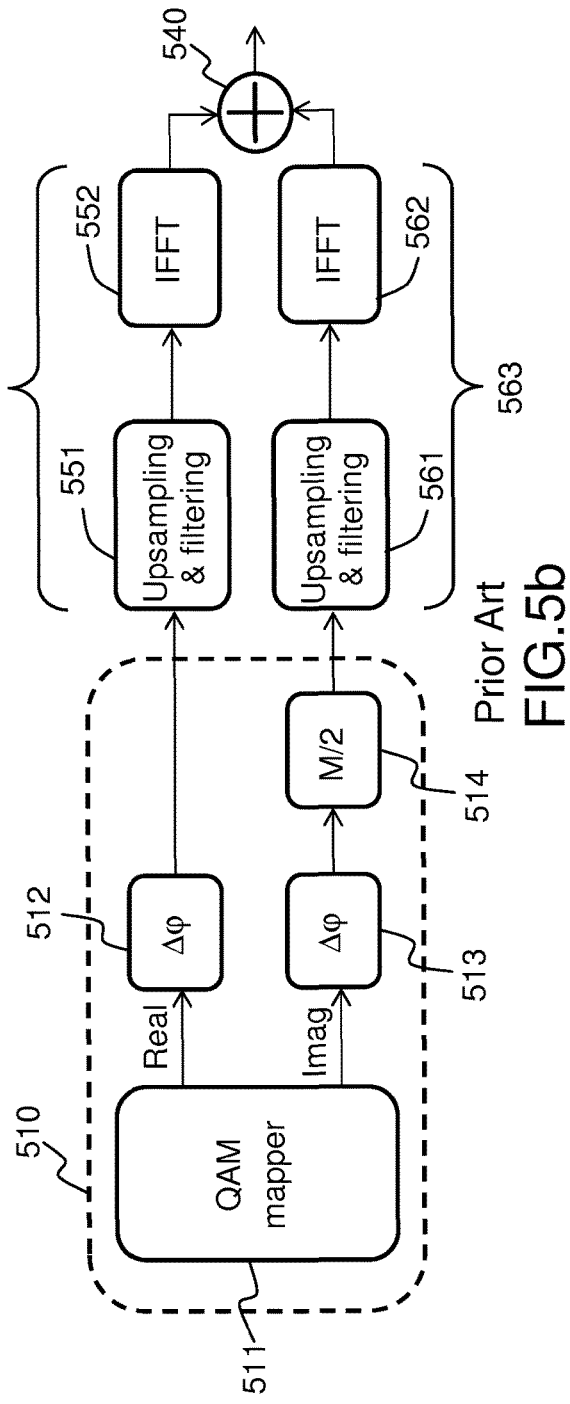
Prior Art
FIG.5a
Prior Art
FIG.5b

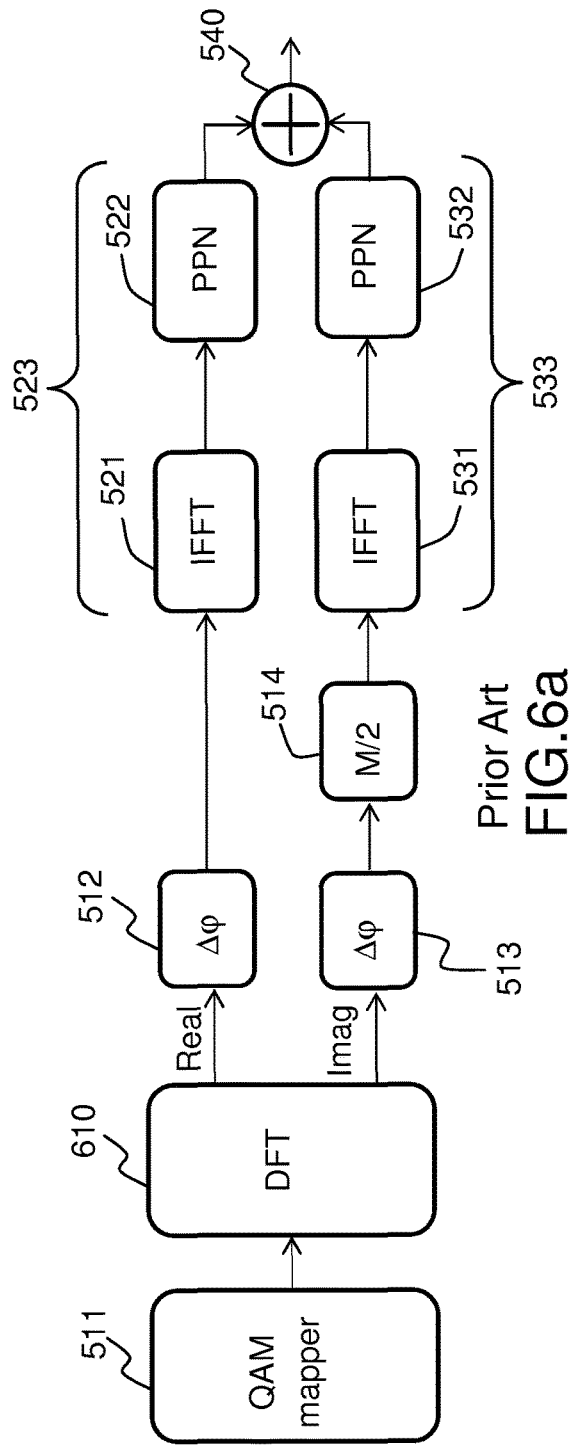
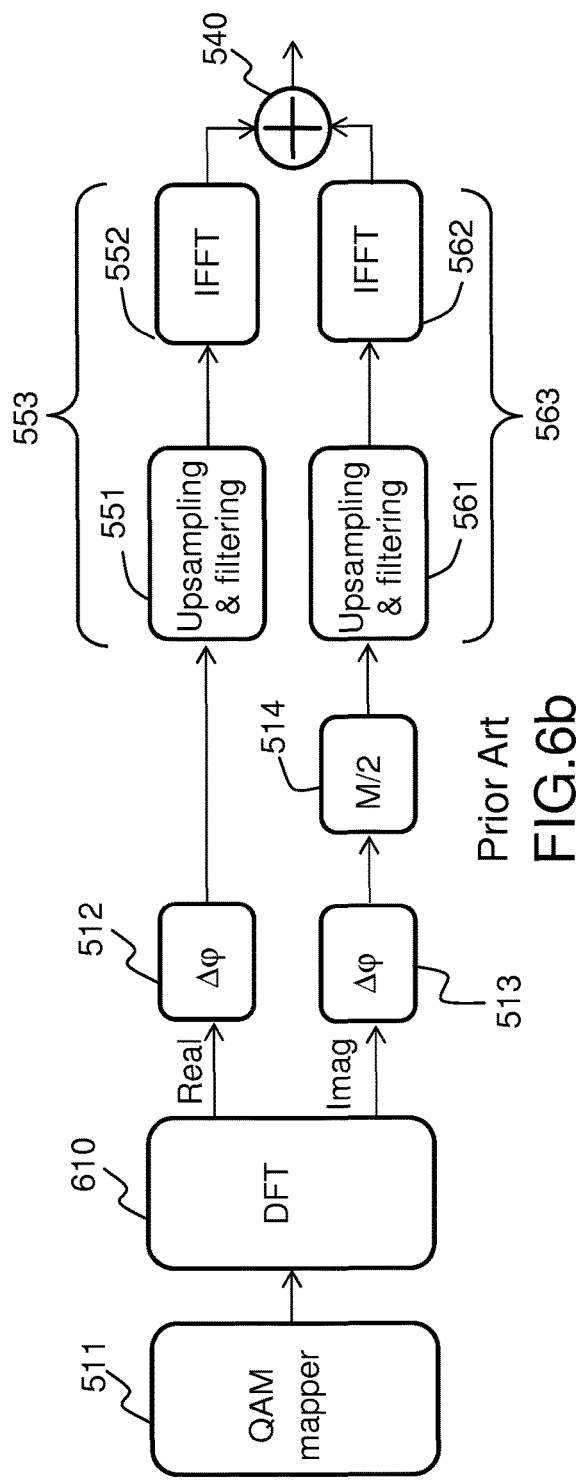

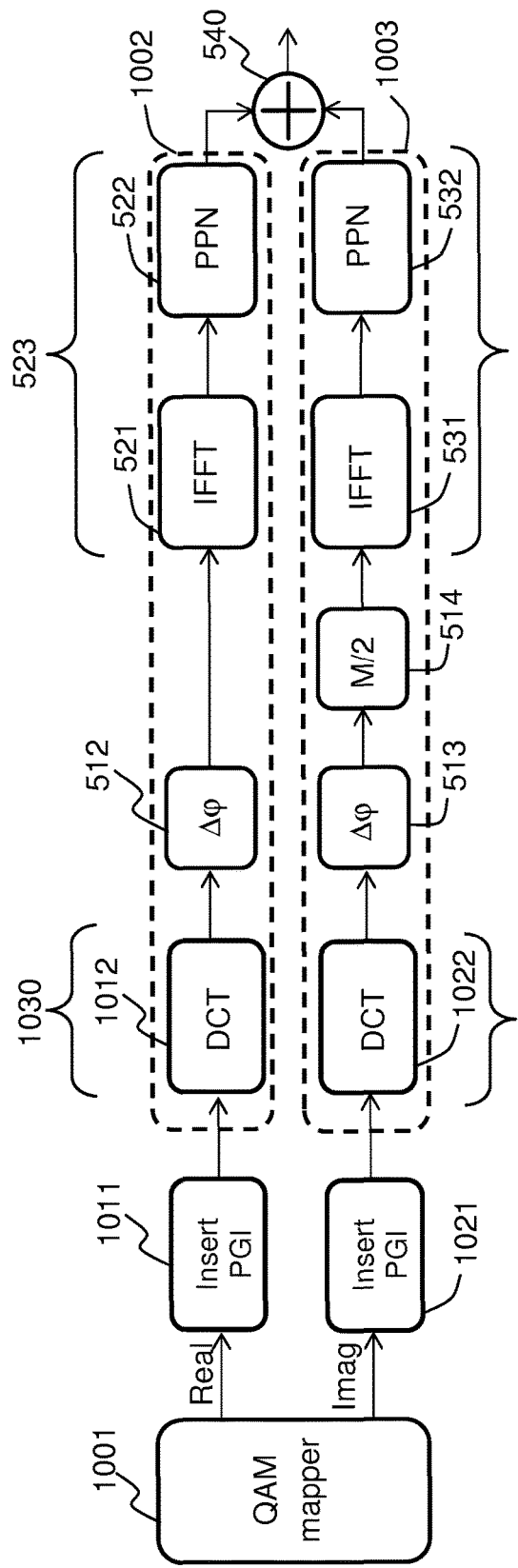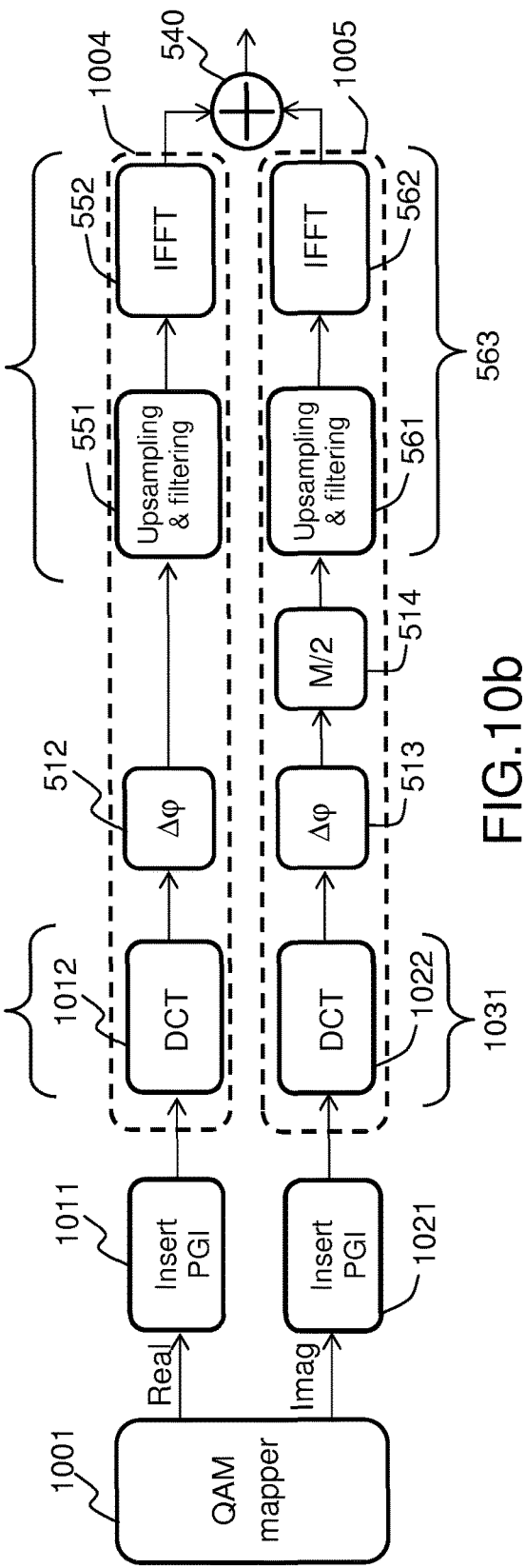

PSEUDO-GUARD INTERVALS INSERTION IN AN FBMC TRANSMITTER

CROSS-REFERENCE TO RELATED APPLICATIONS

This application is a National Stage of International patent application PCT/EP2019/055026, filed on Feb. 28, 2019, which claims priority to foreign European patent application No. EP 18305251.3, filed on Mar. 8, 2018, the disclosures of which are incorporated by reference in their entireties.

FIELD OF THE INVENTION

The present disclosure generally relates to wireless radio communications, and more specifically to FBMC (acronym for Filter Bank Modulation Carrier) transmissions.

BACKGROUND PRIOR ART

Forthcoming mobile communication systems are foreseen to provide ubiquitous connectivity and seamless service delivery in all circumstances. The large number of devices and the coexistence of human-centric and machine type applications expected will lead to a large diversity of communication scenarios and characteristics. In this context, many advanced communication techniques are under investigation.

Among those techniques, one is based on filter-bank multicarrier communications principles. FBMC transmission techniques are based on the well known Orthogonal Frequency-Division Multiplexing transmission techniques (OFDM), where the modulated symbols are mapped over different subcarriers, and transposed into the time domain by an inverse Fast Fourier Transform (IFFT) to be transmitted, but includes an additional step of filtering before transmitting. The filtering is operated by a prototype filter, which is a finite impulse response filter respecting the Nyquist criterion applied over the time domain representation of the signal so as to increase the spectrum efficiency of the transmission.

On the receiver side, the signal transmitted is convoluted with the propagation channel, and may require to be processed by an equalizer in order to compensate the effects introduced by the propagation channel: per subcarrier attenuation and phase rotation, intersymbol and intercarrier interferences, in order to maximize the signal over noise ratio. Advantageously, this equalizer may operate in the frequency domain. To be processed by a low complexity frequency domain equalizer, the subcarriers of the signal to be equalized must be orthogonal, that is to say that there are no intercarrier and intersymbols interferences in the emitted signal. Advantageously, the signal must show some cyclostationarity, so that a signal free from intersymbol and intercarrier interferences can be processed by the receiver. In OFDM, the subcarriers, carrying complex valued data, are orthogonal as each subcarrier shows a spectrum in cardinal sinus, and as the subcarriers are spaced by a constant frequency (called subcarrier spacing) so that their position in the spectrum corresponds to the zeros valued positions of each cardinal sinus signal. This property is achieved by using an IFFT at the transmitter side. In addition, a cyclic prefix is inserted to meet the cyclostationarity requirement. The cyclic prefix is obtained by adding, at the start of each OFDM symbol, a repetition of its end. It may also be achieved by inserting guard intervals, made of null sequences of symbols. Therefore, on the receiver side, an equalizer can be easily implemented to remove intersymbol interferences due to multipath reflections of the propagation environment.

In FBMC, the subcarriers are not orthogonal: a group of M samples to transmit is first oversampled by a factor K, and then filtered by a filter called prototype filter, to give an FBMC symbol of a size KM, where M corresponds to the total number of subcarriers allocated to the transmission, comprising useful subcarriers dedicated to the mapping of the data symbols, pilot subcarriers, guard subcarriers, and zero-padded (not-used) subcarriers. So that the transmission throughput is not reduced due to the oversampling, subsequent FBMC symbols are not transmitted one after the other, but are summed after being delayed by M samples: this is called overlapping. As in OFDM, the FBMC symbols are transposed to the time domain, either after or before the oversampling and filtering stages. As a result of all these processing, in particular the filtering and overlapping, there is no orthogonality in the symbols to transmit.

FIG. 1 represents the steps of oversampling, prototype filtering and overlapping the symbols in an FBMC transmission, which are well known from the person skilled in the art. This figure relates to an implementation where the transposition into the time domain is done prior to the oversampling and prototype filtering. In FIG. 1, FFT bloc #1 101, which is the output of the IFFT transform, made of M samples, is oversampled K times (102, 103 and 104), which consists in repeating K times all the samples of FFT bloc #1, with K=4 in the example. FBMC symbol #1, after filtering of the oversampled samples by the prototype filter 110, is therefore of a size KM. The same operation is performed for FFT blocs #2, #3, and #4. The FBMC symbols #1, #2, #3 and #4 are respectively delayed by M samples and summed. The choice of the prototype filter and oversampling factor is crucial since it has a direct impact over the performances (robustness to the multiple reflection paths) and spectral shape of the signal, but also on the latency of the transmission and the implementation complexity of the algorithms required on the transmitter and receiver side.

In what follows, a symbol is made of one complex valued sample mapped over a specific constellation, typically a QAM constellation (acronym for Quadrature Amplitude Modulation), in that case a QAM symbol. In an FBMC modulator, QAM symbols are processed by blocs of M symbols, and form an FBMC symbol once modulated in FBMC.

Besides having non orthogonal subcarriers, the FBMC signal transmitted over the air, which is made up of overlapping FBMC symbols, do not show some cyclostationarity. Indeed, contrary to OFDM where the end of each OFDM symbols is copied at the beginning of the symbol, in FBMC, introducing a cyclic prefix is not possible for multiple reasons:

introducing specific sequences in the symbols to modulate, as for instance symbol repetitions or guard intervals, is not possible as the transposition of the signal to the time domain on the one hand, and the filtering and overlapping on the other end, would completely modify these sequences: the properties introduced in the signal to modulate would be completely destroyed by the FBMC modulation;

introducing specific sequences in the FBMC modulated symbols, as for instance by repeating some parts of the modulated symbol or by inserting zero-padding sequence like in OFDM, would completely obliterate the effect of the prototype filtering as it would introduce some discontinuities in the signal and therefore deteriorate its spectrum and degrade the signal-to-interference ratio of the modulation.

There is therefore no known method to introduce cyclostationarity in an FBMC signal without degrading its spectrum or degrading the signal-to-interference ratio.

In addition, introducing specific sequences in the modulated symbols, as for instance by copying the end of the symbols at their start like in OFDM, would not be efficient as the position of the cyclic prefix would not be adapted to the FBMC transmissions. This point will be discussed in more details hereafter.

However, the lack of cyclostationarity is counterbalanced in FBMC transmissions by the fact that the symbols are repeated (typically four times) and filtered. The impact of intersymbol interferences due to the previous FBMC symbol over the current FBMC symbol is therefore limited as, even with a high delay spread of the propagation channel, the oversampling and filtering reduce the impact of intersymbol interferences.

In order to bring some orthogonality to the FBMC transmissions, and make possible the implementation of a low complexity equalizer on the receiver side, it is known to use a modulation scheme named FBMC with Offset-Quadrature Amplitude Modulation (FBMC/OQAM, also known as OFDM/OQAM or staggered modulated multi-tone—SMT). According to this modulation scheme, the data are not mapped over QAM complex valued symbols, but over either purely real or purely imaginary symbols in a way that two adjacent subcarriers (in time or in frequency) have a phase difference equal to $\pi/2$. In order to compensate from the transmission throughput losses due to the fact that only the real or imaginary part of the subcarrier is used for transmitting, the time delay between successive FBMC symbols is reduced by half. In addition, the prototype filter is chosen so that interferences between bi-adjacent subcarriers also are purely real (or purely imaginary). Subject to a phase shift of the subcarriers in the receivers, adjacent subcarriers are therefore orthogonal in the real (or imaginary) field, and a low complexity equalizer may be implemented in receivers.

This FBMC/OQAM scheme is considered as a key enabler for the future flexible 5G (acronym designating the $5^{th}$ generation of mobile networks) air interface, due to its good spectral shape, its flexibility, its robustness to multipath propagation, and to the facility to implement a low complexity equalizer.

In a FBMC/OQAM modulator, FBMC symbols are transmitted by pairs in two transmission chains. The symbols are mapped in OQAM as follows:
  bits to transmit are mapped by a QAM mapper,
  the group of M complex symbols that output the QAM mapper is split into two blocs of symbols:
    a first bloc of symbols obtained by selecting the real part of the group of symbols, and
    a second bloc of symbols obtained by selecting the imaginary part of the group of symbols,
  a phase quadrature keying, that is to say a $\pi/2$ (or $\pi/2$) phase rotation, is applied to one symbol over two, over symbols of a different parity in each bloc of symbols. That is to say that, for instance, if the phase quadrature keying is applied to even symbols in the first bloc, it is applied to odd symbols in the second bloc, or conversely.
  the second bloc of symbols is delayed by M/2 samples.

The phase quadrature keying and delaying of the second bloc of symbols guarantee that, before they are transposed into the time domain, two adjacent subcarriers, adjacent either in time or frequency, do not carry samples having a same parity, like a checker board pattern. The first and second blocs of symbols, of a size M, are then FBMC modulated separately by a first and a second transmission chain, and the outputs of the two transmission chains are summed. This is the most common implementation, but other equivalent implementations are possible. In what follows, it will be referred to a first and a second transmission chain, but it is obvious that a single transmission chain processing data at twice the sampling rate can perform both the role of first and second transmission chains.

FIG. 2 represents the FBMC symbols' ordering in an FBMC/OQAM transmission with an exemplary oversampling factor K=4, when transposition into the time domain is performed prior to the oversampling and prototype filtering. A first bloc of symbols is processed by an IFFT. The output of the IFFT, named IFFT bloc #1, is then oversampled by a factor K and filtered by prototype filter 210 to form FBMC symbol #1. Similarly, a second bloc of symbols is processed by another IFFT. The output of the IFFT, named IFFT bloc #2, oversampled and filtered, to form FBMC symbol #2. The first and second blocs of symbols come from the same group of M symbols. As the second bloc is delayed by M/2 with respect to the first one, FBMC symbol #2 is also delayed by M/2 with respect to FBMC symbol #1. The first and second FBMC symbols are summed, as well as they are summed with overlapping FBMC symbols #3 to #2K.

Compared to OFDM transmissions, FBMC (including FBMC/OQAM) transmissions present lower out-of-band power leakages, as there are no sudden transitions between FBMC symbols due to the filtering by the prototype filter. They also are less sensitive to multipath reflections, as FBMC symbols are generally longer than OFDM symbols, which eases the signal equalization when the propagation channel is frequency selective, and reduces intersymbol interferences due to multipath reflections. The throughput of FBMC transmissions is higher as no cyclic prefix is required, and as, for a same bandwidth occupation, the number of guard frequencies can be reduced compared to OFDM, as the filtering results in lower out-of-band power leakage. However, another drawback of the FBMC transmissions comes from the transmission latencies. Indeed, this latency directly depends on the size of the oversampling factor (and length of the prototype filter).

In order to reduce the latencies, it is known from the prior art, as for instance from J. Nadal, C. Nour, and A. Baghdadi, "Low-complexity pipelined architecture for FBMC/OQAM transmitter," IEEE Trans. on Circuits and Syst. II: Express Briefs, vol. PP, no. 99, pp. 1-1, 2015, to use short prototype filters. Such short prototype filters generally come with oversampling factors of one, sometimes two, contrary to standard (long) prototype filters, which are associated to oversampling factors equal or greater than four. By using short prototype filters, the transmissions latency is limited.

It is known to design short prototype filters that preserve the properties of good spectral shape and robustness against carrier frequency offset of FBMC modulations. In addition, using short prototype filters reduces the implementation cost of the transceivers. However, the intrinsic robustness to intersymbol interferences of FBMC transmissions decreases along with the length of the prototype filter, in particular when the multipath reflections show high delay spreads, as the ratio between the number of samples affected by interferences over the total number of samples of an FBMC symbol increases. Thus, intersymbol interferences, which can be neglected when the prototype filter length is high, may severely impact the performances of FBMC transmission when short prototype filters are used.

There is therefore a need for a solution that helps mitigating the intersymbol interferences in an FBMC/OQAM transmission, in particular when this transmission uses short prototype filters.

As indicated previously, contrary to OFDM, this issue cannot be resolved by inserting cyclic prefixes in the modulated signal or by introducing known sequences (as for instance repeating a specific part of a symbol) into the symbols to modulate prior to the FBMC modulation stage.

SUMMARY OF THE INVENTION

It is an object of the disclosure to provide a method and the corresponding equipments, to mitigate the intersymbol interferences in an FBMC transmission, and more particularly in a FBMC/OQAM transmission.

To this effect, the disclosure concerns an FBMC/OQAM modulator, to modulate an FBMC/OQAM signal from a binary stream. The FBMC/OQAM modulator disclosed comprises at least one QAM mapper, to map said binary stream into at least one time domain representation of complex symbols, a first transmission chain and a second transmission chain. The first and second transmission chains each comprise:
  a precoder configured to transpose a first, and respectively a second, set of symbols obtained from the said complex symbols into a frequency domain representation of real, respectively imaginary, samples,
  a phase rotator configured to apply a phase quadrature keying to the samples that output the decoder, and
  an FBMC modulator configured to modulate the output of the phase rotator into a time domain representation of an FBMC symbol.

The FBMC/OQAM modulator disclosed further comprises an adder to sum the output of the first transmission chain with a delayed version of the output of the second transmission chain. It is also further configured to insert guard interval sequences into the binary stream that input the QAM mapper or into the symbols in the time domain representation processed by the precoders.

According to one embodiment, in the FBMC/OQAM modulator disclosed, the first and second sets of symbols are made of distinct symbols from the said complex symbols that are output to the QAM mapper. The precoders of the first and second transmission chains are configured to process respectively the first and second sets of symbols by at least:
  reordering the set of symbols by concatenating to said set of symbols a flipped version of the complex conjugate of the set of symbols,
  performing a Fourier transform over the reordered symbols, and
  applying a $$e^{-i\pi \frac{k}{N}}$$

linear phase shift to the samples that output the Fourier transform, where N is the number of samples that output the Fourier transform, and k is the index of the sample to which the phase rotation is applied.

According to another embodiment, in the FBMC/OQAM modulator disclosed, the first (and respectively second) set of symbols is made of the real (respectively imaginary) part of the said complex symbols that are output to the QAM mapper. The precoder of the first transmission chain and the precoder of the second transmission chain are configured to perform a Direct Cosine transform (1012, 1022) over the respective sets of symbols.

In the FBMC/OQAM modulator disclosed, the FBMC modulators of the first and second transmission chains are configured to modulate a time domain representation of an FBMC symbol from samples in a frequency domain representation by performing at least:
  an oversampling, by a factor K greater or equal than one,
  a filtering by a prototype filter, and
  an inverse Fourier Transform.

In embodiments where an oversampling factor K of the FBMC modulation is greater than one, the FBMC/OQAM signal modulated overlaps with K−1 other FBMC/OQAM signals.

Advantageously, the guard interval sequences are inserted so as to be positioned over samples comprising samples situated substantially at the end of the first half of the FBMC symbols generated by the FBMC modulators.

Advantageously, the guard interval sequences are null sequences.

The disclosure further concerns a radio communication equipment, comprising at least one FBMC/OQAM modulator according to the disclosure.

In addition, the disclosure concerns a method to modulate an FBMC/OQAM signal from a binary stream. The method comprises the steps of:
  performing a QAM mapping of said binary stream, to obtain a time domain representation of complex symbols,
  computing a first and a second set of symbols from the said complex symbols,
  processing the first set of symbols by a first processing chain and the second set of symbols by a second processing chain.

The processing performed by the first processing chain over the first set of symbols, and by the second processing chain over the second set of symbols, comprises:
  precoding the set of symbols to transpose it into a frequency domain representation of real, respectively imaginary, samples,
  applying a phase quadrature keying to the frequency domain representation of samples,
  applying an FBMC modulation to the rotated frequency domain representation of complex samples.

The method disclosed further comprises:
  delaying the samples of the second processing chain,
  summing the output of the first processing chain with the output of the second processing chain.

It further comprises a step of inserting guard interval sequences into the binary stream or into the symbols in the time domain representation that are processed by the precoders.

The disclosure further concerns a computer program adapted to implement the method disclosed, and a computer readable medium incorporating the computer program.

BRIEF DESCRIPTION OF THE DRAWINGS

The disclosure will be better understood and its various features and advantages will emerge from the following description of a number of exemplary embodiments and its appended figures, provided for illustration purposes only, in which:
FIGS. 5a and 5b represent two implementations of an FBMC/OQAM modulator according to the prior art,
FIGS. 6a and 6b represent two implementations of Single Carrier FBMC/OQAM modulators according to the prior art,
FIGS. 10a, 10b, 10c and 10d represent four other exemplary embodiments of FBMC/OQAM modulator's implementation according to the disclosure, based on Direct Cosine Transforms.

The examples disclosed in this specification are only illustrative of some embodiments of the disclosure.

DETAILED DESCRIPTION OF THE INVENTION

The present disclosure tries to overcome the issue of intersymbol interferences and lack of cyclostationarity in an FBMC/OQAM transmission, in particular when said transmission is based on short prototype filters, by inserting guard intervals made of null sequences or known sequences into the symbols to be modulated in a way that they have the expected properties in the FBMC/OQAM signal transmitted over the air. To this end, two issues have to be solved:
  where does the guard interval sequences have to be inserted, and
  how to insert guard intervals sequences into a FBMC symbol transmitted over the air knowing that the samples to transmit are oversampled, filtered, transposed into the time domain, summed with another FBMC symbol and overlap with other FBMC/OQAM signals when K>1.

Figure 3:
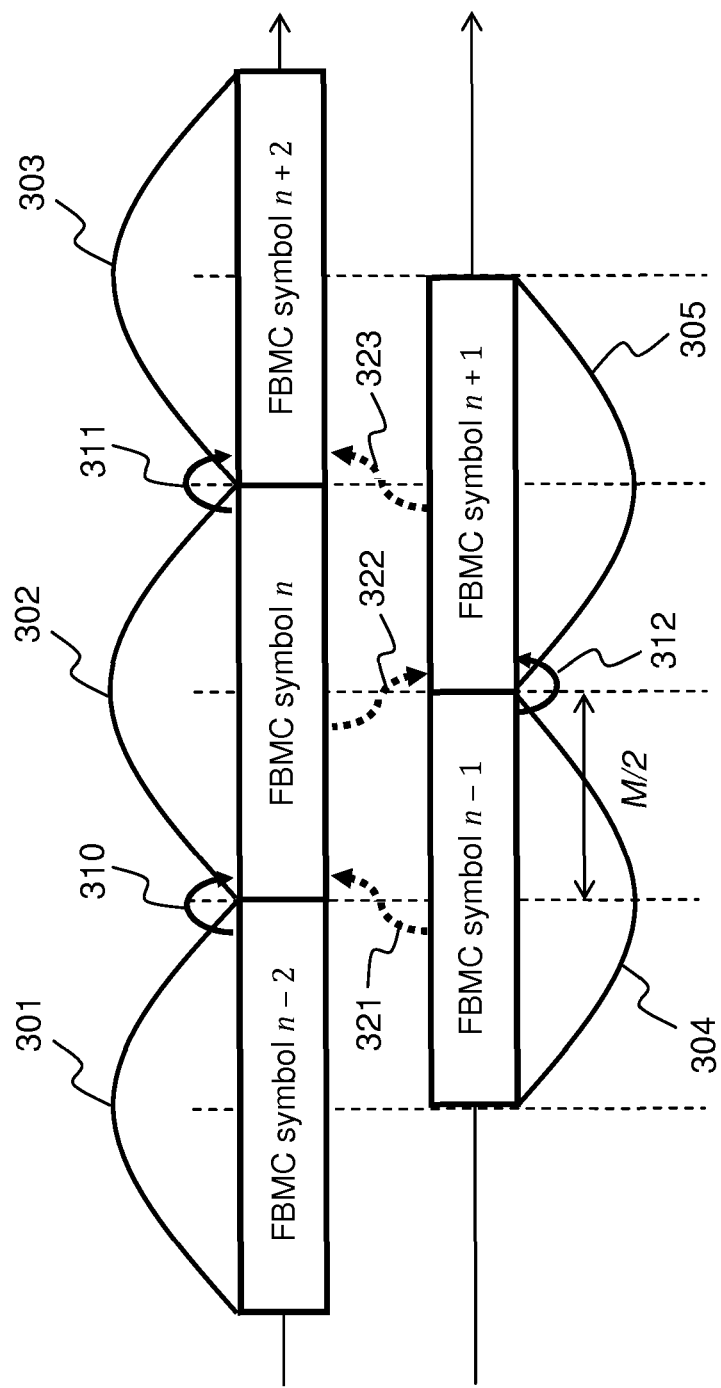
FIG. 3 represents the sources of intersymbol interferences in an FBMC/OQAM transmission.

Regarding the position of the guard intervals, FIG. 3 represents the sources of intersymbol interference in an FBMC/OQAM transmission. For illustration and simplification purposes, in FIG. 3 and in the subsequent figures, the FBMC modulation considered have an oversampling factor of K=1, but the content of the disclosure applies exactly the same way for higher values of K (for instance, for K=4, which is a typical case for standard prototype filters).

In FIG. 3, even blocs of symbols n, n−2, n+2, made of phase quadrature shifted real symbols, are FBMC modulated by the first transmission chain to provide FBMC symbols, while blocs of symbols n−1, n+1, made of phase quadrature shifted and delayed imaginary samples, are FBMC modulated by the second transmission chain. FBMC modulation consists in oversampling the blocs of symbols when K>1, and filtering it with a prototype filter. The filtering windows are schematically represented on FIG. 3, 301 to 305.

Intersymbol interferences, related to multipath reflections of the signal, can be divided into two categories:
  Interferences 310, 311, 312, between FBMC symbols of a same transmission chain, for instance interferences 310 on FBMC symbol n due to delayed paths of the last samples of symbol n−2. Thanks to the prototype filtering, the last samples of symbol n−2, which may be delayed by the propagation channel to interfere with symbol n, have a low power level. Thus, except for highly spread propagation channels, interferences generated between symbols modulated by a same transmission chain are not significant;
  Interferences 321, 322, 323, between FBMC symbols of a different transmission chains, as for instance interferences 321 on symbol n due to delayed paths of the samples of symbol n−1. Due to the (M/2) delay introduced by the OQAM modulation, the samples causing the intersymbol interferences are the one situated just before the middle of symbol n−1. The number of symbols interfering depends on the propagation channel delay spread. As situated substantially before the middle of symbol n−1, these symbols are not attenuated by the prototype filtering 304, and therefore come to interfere with FBMC symbol n, in a place where symbol n gets attenuated by the prototype filter. The weight of these interferences is therefore significant.

Thus, contrary to OFDM, the samples interfering with an FBMC symbol (FBMC symbol n) are not the last samples of the previous symbol modulated by the same transmission chain (FBMC symbol n−2) or by the other transmission chain (FBMC symbol n−1), but the samples 312 situated just before the middle of the previous FMBC symbol modulated by the other transmission chain (FBMC symbol n−1). The disclosure proposes, in a preferred embodiment, to insert guard intervals at the position of these samples, so as to reduce or to control the intersymbol interferences they generate.

In addition, FBMC symbol n taken in isolation is almost cyclostationary, as the prototype filter attenuates the samples situated at the borders of the signal. Intersymbol interferences due to the effects of the propagation channel over symbol n−2 do not destroy this cyclostationarity, as interfering samples from symbol n−2 are also attenuated by the prototype filter. However, when summed with the respective symbol modulated from the other transmission chain, intersymbol interferences 321 due to the effects of the propagation channel over the symbol n−1 are not attenuated by the prototype filter, and destroy the quasi-cyclostationarity.

The position of the guard intervals can be modified to some extent, as long as it comprises samples situated substantially at the end of the first half of the FBMC symbols. For instance, an embodiment of the FBMC modulator where the guard interval sequences would be positioned at the end of the first half of the FBMC symbols but would exclude the few last samples of this interval would not be as efficient as the preferred embodiment, but would still reduce the intersymbol interferences compared to the previous art. Furthermore, the modulator disclosed can easily be modified to add additional guard interval sequences, while these additional sequences would have no effect over the intersymbol interferences reduction.

Figure 4:
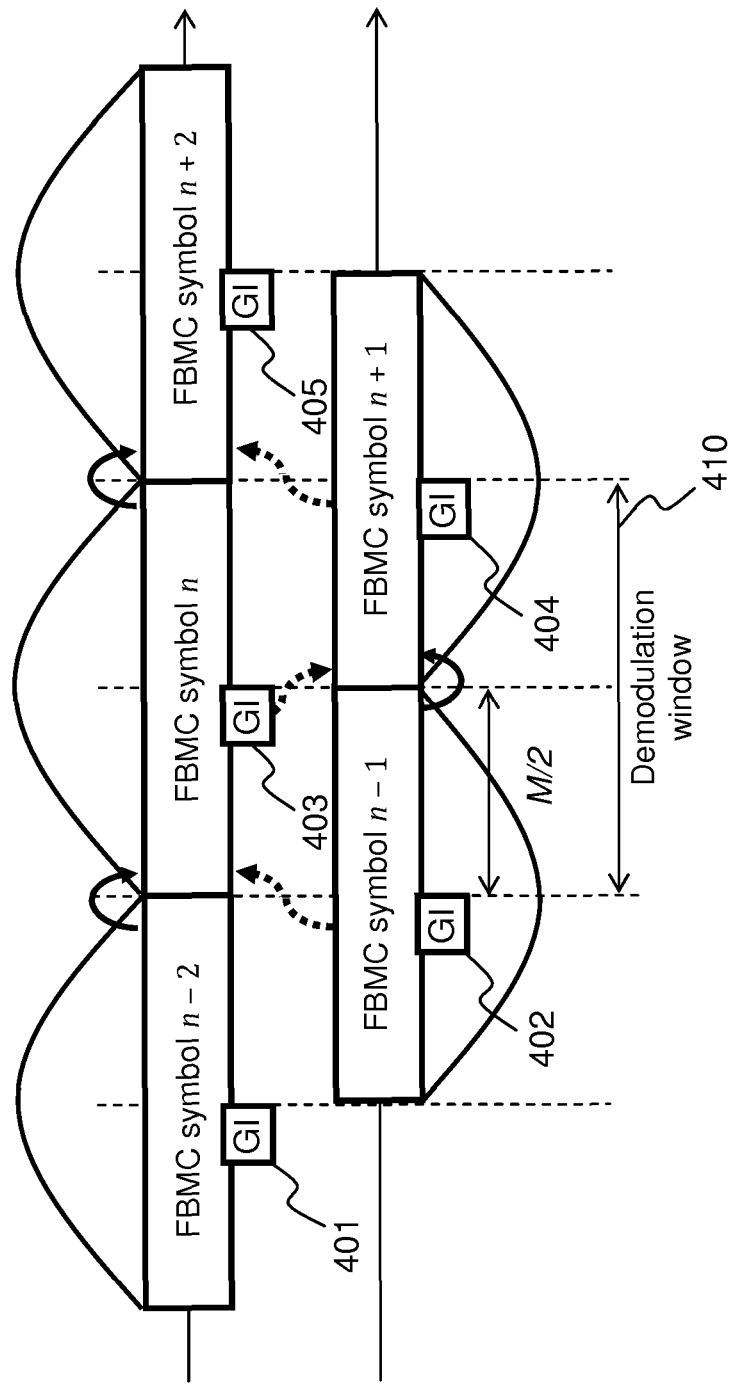
FIG. 4 represents the structure of FBMC symbols transmitted by an FBMC/OQAM modulator according to an embodiment.

FIG. 4 represents the structure of FBMC symbols transmitted by an FBMC/OQAM modulator according to an embodiment, wherein guard intervals 401 to 405 (GI) are inserted in the FBMC symbols to solve the problem of intersymbol interferences. The samples of the guard interval represent an additional signalization which therefore reduces the data payload.

By transmitting null sequences within the guard intervals, the intersymbol interferences are totally removed. However, the transmission of null samples may slightly increase the peak to average power ratio (PAPR), which may be seen as an issue. Indeed, a high PAPR is an issue due to power amplifiers non-linearities, as the efficiency of power amplifiers decreases along with the increase in PAPR.

It is also possible to transmit sequences within the guard intervals, as the intersymbol interferences generated by convolution of these sequences and the propagation channel can be easily removed. These sequences may be QAM sequences modulating low data rate information or sequences having specific properties, as long as the sequences transmitted within each FBMC symbol of a frame are identical. Specific sequences may be sequences well known from the person skilled in the art, like for instance CAZAC sequences (Constant Amplitude Zero Autocorrelation), known for their properties of low PAPR. At the receiver side, when they are known, these sequences may be used to improve the channel estimation, as for instance to estimate the carrier-frequency offset.

Another consequence of the guard intervals insertion is that it brings some cyclostationarity to the FBMC symbols transmitted. Indeed, the position of a guard interval over one transmission chain matches the position of the border of the filtering window on the other transmission chain. Therefore, while one transmission chain transmits guard intervals, the signal transmitted by the other one is almost null. The signal transmitted, resulting of the sum of the signals modulated by the two transmission chains, is therefore almost cyclostationary, which ease its equalization. Arrow 410 represents the window that has to be considered to demodulate symbol n. Guard intervals 402 and 404 ensure the cyclostationarity of this symbol.

The guard interval sequences' length is an implementation issue resulting of a compromise between performances and throughput that has to be done considering the propagation environment and the data rate requirements.

The other issue addressed by the disclosure is the way to insert such guard interval sequences in the FBMC/OQAM signal. FIGS. 5a and 5b represent two implementations of an FBMC/OQAM modulator according to the prior art.

FIG. 5a represents an FBMC/OQAM modulator based on filter banks, known as an FBMC polyphase network (PPN) modulator. This PPN-FBMC/OQAM modulator comprises an OQAM mapper 510, comprising a QAM mapper 511 mapping a binary stream of CN bits, N being the number of useful subcarriers, that is to say the number of subcarriers used to transmit useful data, and C the constellation order (for instance, using a 16QAM mapper, the number of bits is of 4N). In case N≠M, symbols to be mapped over the pilot and guard subcarriers may be inserted into the complex samples just after the data mapping. This insertion is not addressed in the following, as it is not part of the disclosure and is well known from the one skilled in telecommunications.

The OQAM mapper 510 further comprises phase rotators 512 and 513, to perform a π/2 phase shift keying over respectively the real and the imaginary part of the mapped symbols. The phase shift keying is applied over respective blocs of real and imaginary symbols, that is to say that when the phase shift is applied to the first, third, . . . symbols of a bloc of symbols, it is applied to the second, fourth, . . . imaginary of the other bloc of symbols. The QAM mapper also comprises a delay line 514, to delay one bloc of symbols by M/2 with respect to the other one. The symbols that output the OQAM mapper are processed by two independent FBMC modulators 523 and 533. According to this implementation, the FBMC modulators comprise in sequence an inverse Fast Fourier Transform 521, 531, of a M size, and a Polyphase Network 522, 532, which performs all at once the oversampling of each signal when K>1, and its filtering window by the prototype filter. The outputs of the two processing chains are combined using an adder 540.

FIG. 5b represents an alternate known FBMC/OQAM modulator, called the Frequency Spread (FS) implementation, described in M. Bellanger, "FS-FBMC: an alternative scheme for filter bank based multicarrier transmission", Proceedings of the 5$^{th}$ International Symposium on Communications, Control and Signal Processing, ISCCSP 2012, Rome, Italy, 2-4 May 2012. It comprises an OQAM mapper 510 performing the exact same processing as in FIG. 5a. The two blocs of symbols that output the OQAM mapper are then processed by two distinct FBMC modulators 553 and 563. According to this implementation, the FBMC modulators comprise in sequence an up-sampling and filtering 551, 561, which upscale each bloc of symbols by a factor K (inserting K−1 zeros between each successive QAM symbol) and filters (through a circular convolution) the up-sampled signal by the frequency response of the prototype filter. Signals are then transposed into the time domain by an Inverse Fast Fourier Transform block 552, 562. The outputs of the two processing chains are combined by adder 540.

The FBMC/OQAM signals that output each of the implementation of FIG. 5a and FIG. 5b are similar.

Such modulators do not allow introducing guard intervals by adding specific sequences of samples in the blocs of symbols to transmit prior the FBMC modulation, as these guard intervals would be modified by the FBMC modulation and would not show the characteristics expected. Thanks to the disclosure, an additional step is inserted, prior to the FBMC modulation (that is to say prior to the stages of transposing the signal in the time domain, oversampling, filtering and overlapping), of guard interval insertion performed in a downsampled time domain, that is to say in a time domain prior to the FBMC modulation. This insertion shall be followed by a transposition in the frequency domain, so that the resulting signal can be FBMC modulated in a similar way as in known implementations.

It is known from prior art single-carrier FBMC modulators, by analogy with the known single carrier OFDM, which include a preliminary precoding stage, performed in the time domain, prior to the IFFT. Such implementations are known in OFDM for PAPR reduction purposes, as the PAPR of the signal may be adjusted in the time domain prior to the precoding. Indeed, PAPR is one of the main issues regarding multi-carrier modulations, which is due to the fact that the signal transmitted is the sum of a plurality of subcarriers modulated at different frequencies from symbols having various amplitudes and phases. Once transposed into the time domain, the sum of these subcarriers may be constructive on some samples and destructive on others. The amplitude of the signal therefore varies a lot. A typical PAPR value for an OFDM modulation is of about 10 or 12 dB, while it is of about 0 to 3 dB for single-carrier modulations. By adding an initial precoding stage in the time domain, the FBMC modulation comes close to the performances of a single-carrier transmission, even when using a high number of subcarrier, reducing thus the PAPR.

It is known from the International Patent Application WO 2014/124661 A1, to insert zero sequences in the time domain prior to the final IFFT of an OFDM modulator. However, these teachings cannot be applied in an FBMC/OQAM modulator, as the position of the guard sequences would not fit with the specificities of OQAM (in OFDM, guard interval sequences are located at the beginning of the samples, not in the middle). In addition, the separation in two transmission chains respectively processing blocs made from the real and imaginary parts of the QAM symbols, and the delaying of the second transmission chain, come as an obstacle to the implementation of this solution into a single-carrier FBMC/OQAM modulator known from the prior art.

FIGS. 6a and 6b represent two different implementations of Single Carrier FBMC/OQAM modulators according to the prior art. FIGS. 6a relates to a PPN-FBMC/OQAM modulator with a single carrier precoding. A binary stream of a size CN is mapped in the time domain by a QAM mapper 511 and transposed into the frequency domain by a precoder performing a Fourier Transform 610 (which may for instance be a Discrete Fourier Transform (DFT) or a Fast Fourier Transform (FFT)) of a size N. In order to comply with the OQAM mapping, a phase quadrature keying 512 is applied to the real part of the samples that output the DFT. The samples are then processed by an FBMC modulator 523, which in this implementation is made of an IFFT 521 and a polyphase network 522 performing both the oversampling and prototype filtering. A phase quadrature keying 513 is applied to the imaginary part of the samples that output the DFT 610. The samples are then processed through a delay line 512, delaying it of M/2, and modulated by an FBMC modulator 533, comprising their transposition into a time domain representation through IFFT 531 and their processing by a polyphase network 532. Those two FBMC symbols are combined by adder 540 to form the FBMC/OQAM signal.

FIG. 6b relates to a FS-FBMC/OQAM modulator with a single carrier precoding. As for the PPN-FBMC/OQAM modulator, the data bits to transmit are modulated in the down-sampled time domain by a QAM mapper 511 and transposed into a frequency domain representation by a precoding DFT or FFT 610 of a size N. In order to perform the OQAM mapping, the real part of the samples that output the DFT are processed by a phase quadrature keying 512 and an FBMC modulator 553, comprising a stage of upsampling and filtering by a prototype filter 551 and a stage of transposition into a time domain representation by IFFT 552 of a size KM. The imaginary part of the samples that output the DFT are processed by phase quadrature keying 513, delayed of M/2 by delay line 512, and modulated by FBMC modulator 563, comprising the upsampling and filtering 561 and the transposition into a time domain representation by IFFT 562 of a size KM. Those two symbols are then summed by adder 540.

The implementations of FIGS. 6a and 6b are known to help reducing the PAPR of an FBMC transmission as the time domain representation of the signal to transmit is the image of the time domain representation of the signal generated prior to the precoding DFT 610. The PAPR of the signal to transmit therefore directly depends on the PAPR of the samples generated by the QAM modulator and the number of subcarriers allocated to the transmission.

However, as the real and imaginary parts of the samples that output the precoding DFT 610 are processed independently, in particular through distinct IFFTs (521 and 531, 552 and 562), the time domain representation of the signal to transmit is no longer the image of the time domain representation of the signal prior to the precoding DFT. These implementations thus do not allow recovering, at the output of each transmission chain, specific guard interval sequences inserted in the time domain representation prior to the FBMC modulation (i.e. inserted into the binary data stream before the QAM mapper 511, or into the complex symbols that are output by the QAM mapper).

The FBMC/OQAM modulator disclosed therefore modifies the structure of known FBMC/OQAM modulators, keeping the idea of a precoding DFT that makes possible to shape the signal upstream the FBMC modulator in the time domain, by processing in parallel two transmission chains in a way that guard interval insertion is made possible. To this end, the FBMC/OQAM transmitter according to one embodiment processes the samples upstream the precoding DFT so that the output of the DFT are purely real (or imaginary). Thus, the FBMC/OQAM transmitter according to the disclosure allows obtaining, at the output of the FBMC modulator, an upsampled version of the samples that input the precoding DFT. The FBMC/OQAM transmitter according to the disclosure comprises two transmission chains, each chain comprising a precoder 730, 731 including a DFT:

one chain being configured to process complex samples that output a QAM mapper so that the output of the samples after the precoding DFT are purely real, and one chain being configured to process the complex samples that output a QAM mapper so that the samples after the second precoding DFT are purely imaginary (or purely real and followed by a +π/2 shift, which can be merged with the successive step of phase quadrature keing).

Both transmission chains are then modulated as may be done in a state of the art FBMC/OQAM modulator.

Figure 1:
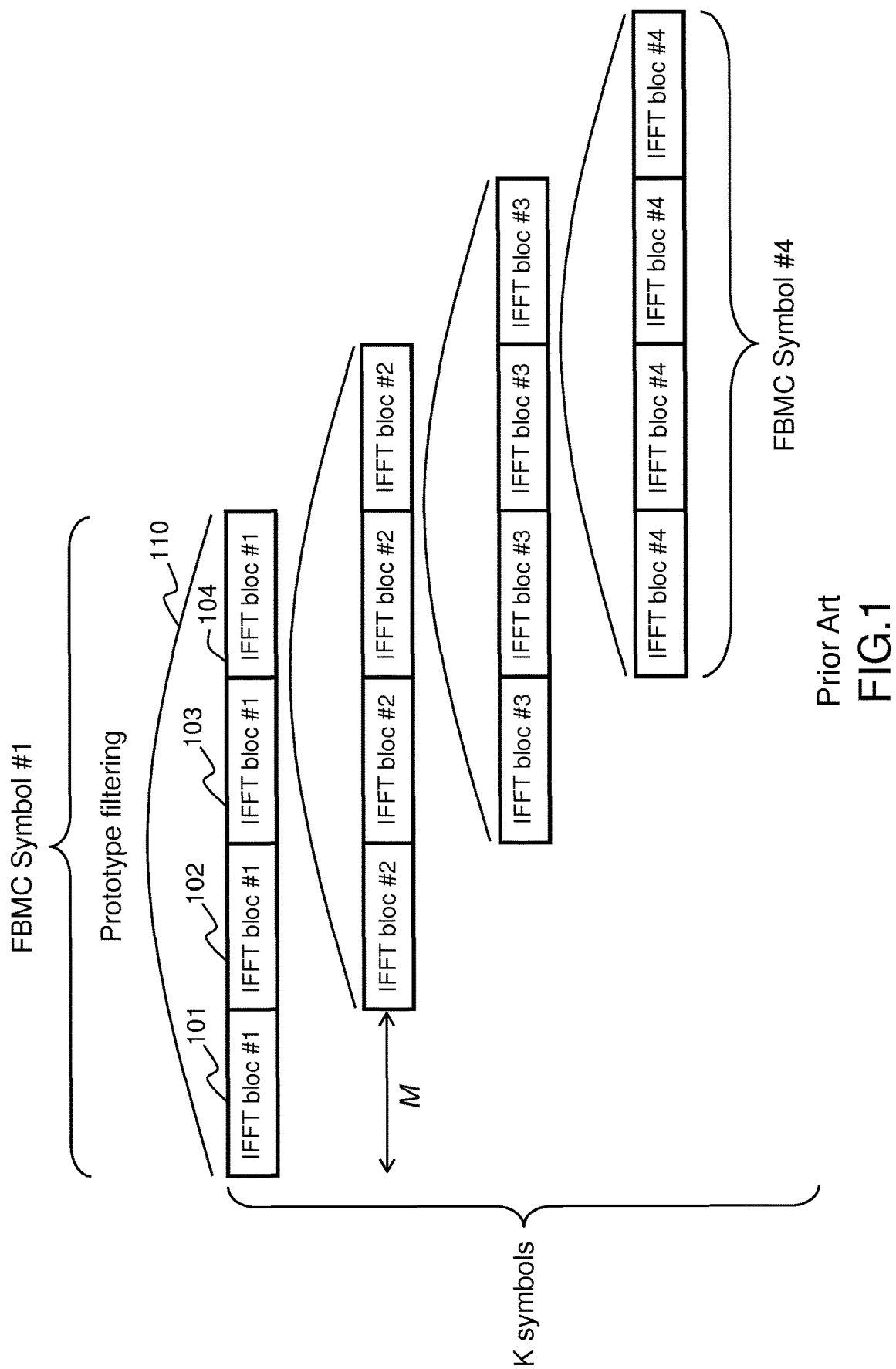
FIG. 1 represents the steps of oversampling, prototype filtering and overlapping the symbols in an FBMC transmission.
Figure 2:
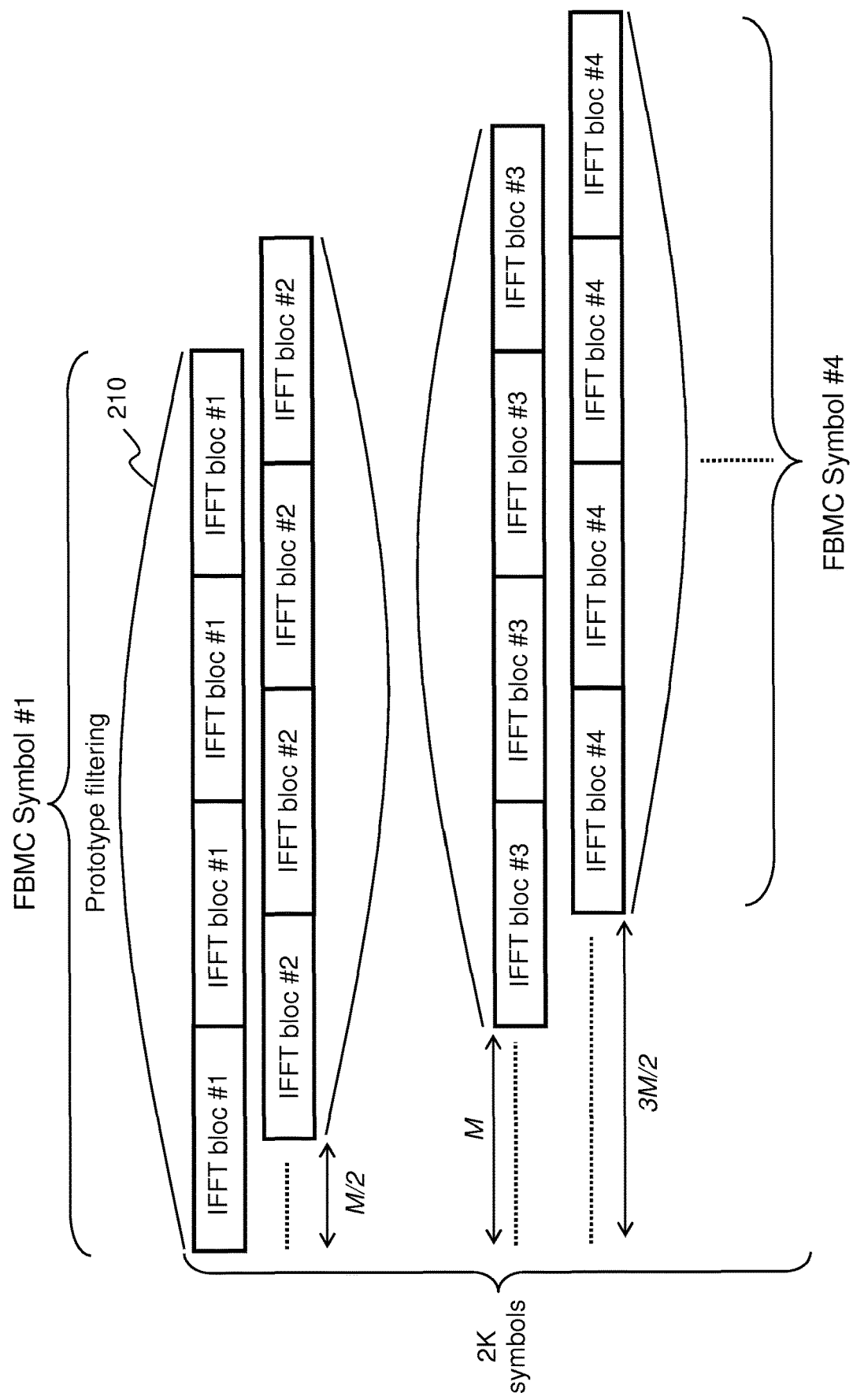
FIG. 2 represents the FBMC symbols' ordering in an FBMC/OQAM transmission.
Figure 7A:
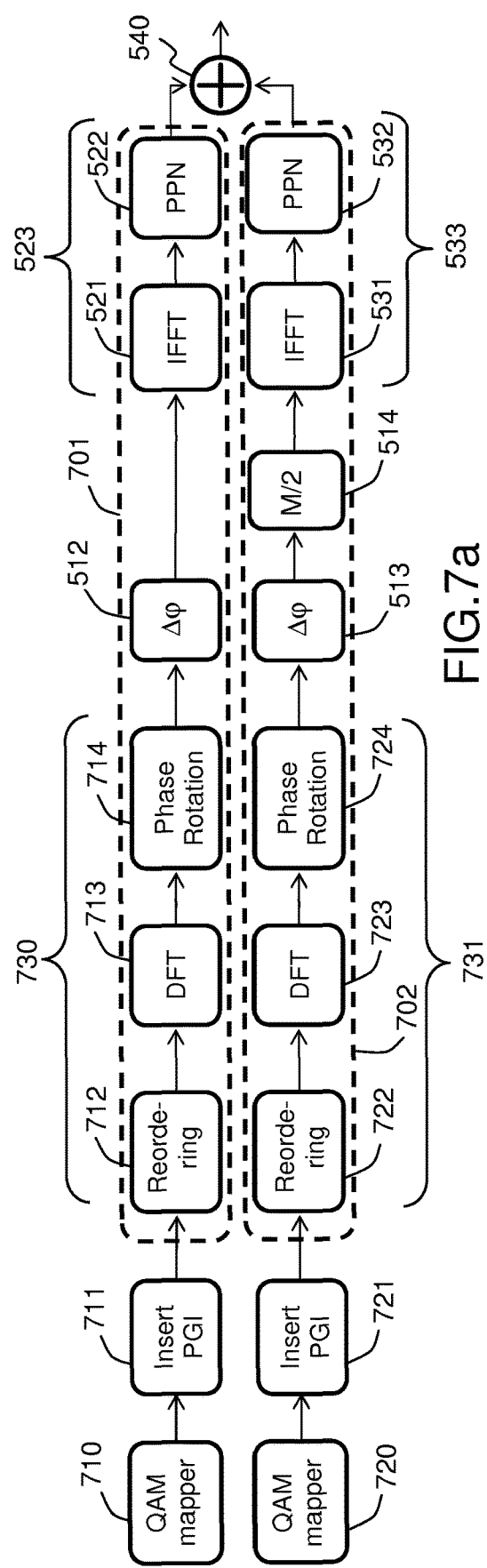
FIGS. 7a, 7b, 7c and 7d represent four exemplary embodiments of FBMC/OQAM modulator's implementation according to the disclosure, based on Fourier transforms.
Figure 7B:
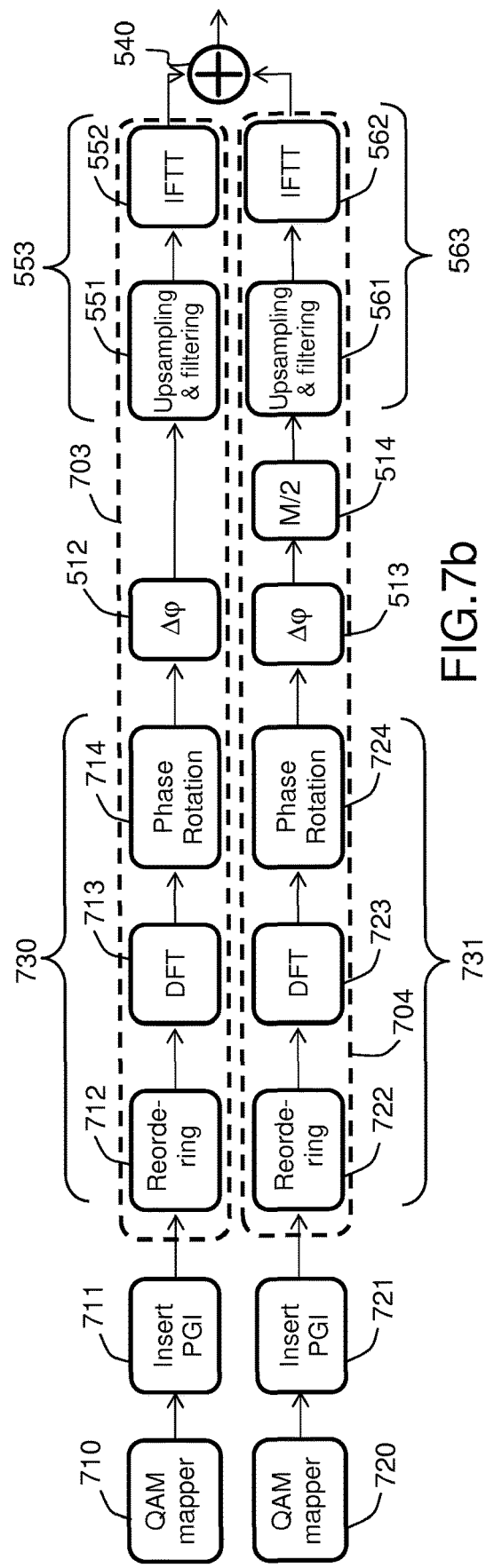

FIGS. 7a and 7b represent two illustrating embodiments of an FBMC/OQAM modulator according to the disclosure. As indicated previously, these implementations relate to oversampling factors of K=1. In an FBMC/OQAM modulator according to the disclosure where the oversampling factor K is greater than one, the output of FIGS. 7a and 7b would be summed with the output of transmission chains relative to overlapping symbols, as described in FIGS. 1 and 2.

FIG. 7a is based on the PPN-FBMC/OQAM modulator implementation. This exemplary embodiment implementation comprises two transmission chains 701 and 702, wherein the output of the precoding stages are respectively purely real and purely imaginary samples, and are then FBMC modulated in parallel, delayed and summed. In this embodiment, the PPN-FBMC/OQAM modulator comprises two QAM mappers (710, 720), each processing a binary stream which size is of CN' bits, where N'=N/2−$L_{GI}$, $L_{GI}$ being the number of subcarriers allocated to the transmission of the guard intervals sequences. For instance, considering a 16QAM mapping, the size of the bit stream to map is of 4N'. At the output of the QAM mappers are then a first and a second set of complex symbols.

Complex symbols relative to a guard interval sequence 711 are introduced into these sets of complex symbols, in the downsampled time domain. Each set of symbols is then transmitted to a first (701) and respectively second (702) transmission chain. Each transmission chain comprises a precoder (730, 740) that transposes these symbols from the time domain representation to a frequency domain representation in a way guaranteeing that the samples that output the precoders are real, respectively imaginary samples. To this end, the complex samples constituting a guard interval sequence are inserted (711, 721) at specific positions in the set of symbols , which are then reordered, the reordering stage (712, 722) comprising concatenating the complex symbols with a flipped version of the complex conjugate of these complex samples. The reordered complex samples are then transposed into the frequency domain by a Fourier transform (713, 724), as for instance a Fast Fourier Transform or a DFT, of a size N. A linear phase rotation (714, 724) is then performed over the samples in the frequency domain.

The goal of the reordering (712, 722) and linear phase rotation (714, 724) stages is to shape the data processed by the precoders so that its outputs are purely real or imaginary, which is the form expected from the output of an OQAM modulator. These steps are described in more details later on. When required, pilot samples may be added at the output of the phase rotator.

The samples that output the phase rotator (714, 724) are real, respectively imaginary, samples. A phase quadrature keying (512, 513), which is a phase rotation of $\pm\pi/2$, is applied to one sample over two, considering different samples in the two transmission chains. Then, an FBMC modulation (523, 533) is processed over these samples, which comprises an IFFT transform (521, 531) of a size M, to transpose the samples into a time domain representation, and a polyphase network (522, 532), just like in known modulators.

In addition, in the second transmission chain 702, the precoder 731 comprises an additional $\pi/2$ phase rotation that is applied to the samples that output the DFT 723, in order to make the output of the precoder purely imaginary samples. Advantageously, this additional rotation may be combined with the phase rotation 724 or with the phase quadrature keying 513. The imaginary samples that output precoder 731 are further delayed (514) by M/2 samples, but this delaying might either be performed at any other stage of the transmission chain, to delay the samples that output the second transmission chain with regard to the samples that output the first transmission chain.

The outputs of the two transmission chains are combined by adder 540.

Some variations may be easily performed over the modulator implementation described in FIGS. 7a and 7b by the one skilled in the art. For instance, in FIGS. 7a and 7b, the guard interval sequences may be inserted (711, 721) at the entrance of the precoder, but they could as well be inserted without any prejudice in the precoder after the reordering stage (712, 722) as long as this insertion is performed prior to the signal transposition in the frequency domain, that is to say before the Fourier Transform 713 and 723. It would also be obvious for the one skilled in telecommunication domain, to use only one QAM mapper to map the entire binary stream, and to input half of the mapped samples, into respectively the first and second transmission chains, or to modify the position of delay line 514.

Figure 7C:
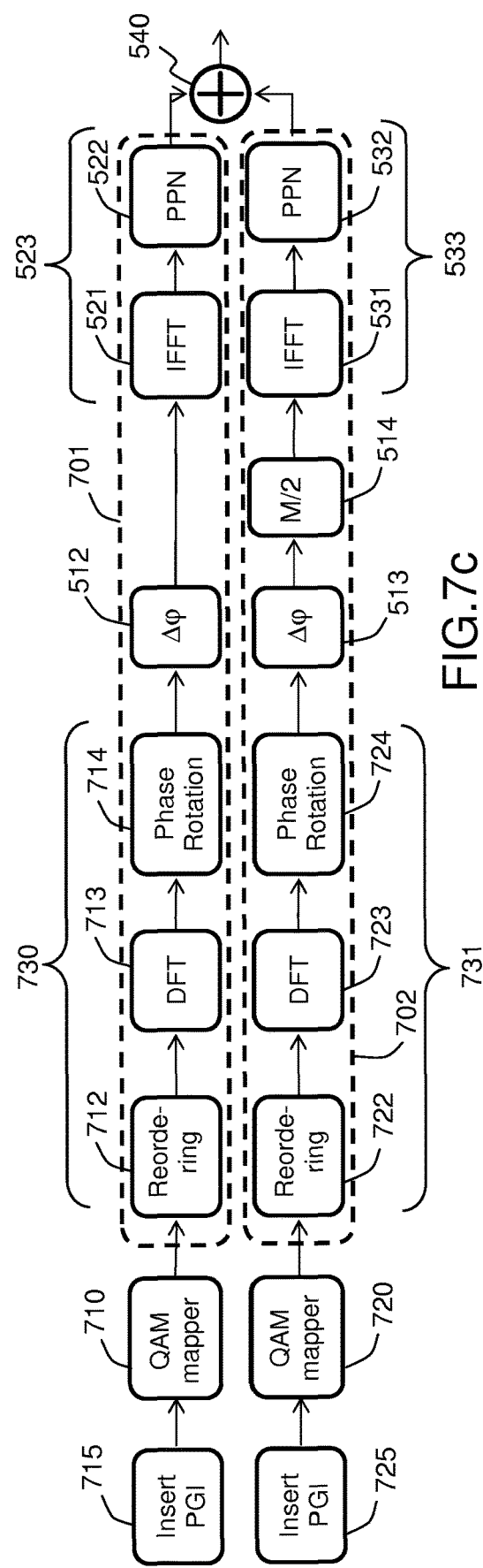

In another embodiment, represented in FIG. 7c the guard interval sequences take the form of a binary stream inserted in the data (715, 725) that are inputs to QAM mappers 710 and 720. In that case, QAM mappers 710 and 720 take as input a binary stream of a size CN/2=C. (N'+$L_{GI}$), comprising both the input data to modulate and the guard interval sequences. The rest of the transmission chains is similar to the one described in FIG. 7a. In an alternate embodiment, the reordering of the symbols (712) may be performed prior to the QAM mapping, directly over the binary stream comprising the guard interval sequences.

These sequences inserted may be made of null samples, or may be predefined sequences of complex samples. In the latter case, the predefined sequence may be retrieved from a memory, in the form of modulated samples or of a bitstream that has to be processed through a QAM mapper before their insertion. Using null sequences will reduce the power consumption, but will slightly distort the PAPR of the signal emitted. The choice of the sequences is therefore an implementation issue that must be done considering the equipment and operational conditions.

The evolutions according to the disclosure made to known FBMC/OQAM modulators in order to make possible the pseudo guard intervals insertion, could be adapted to any FBMC modulator implementation (FS or PPN). For instance, FIG. 7b represents another embodiment of an FBMC/OQAM modulator according to the disclosure, based on the FS-FBMC/OQAM modulator's implementation. It comprises two QAM mappers (710, 720), mapping each half of the bitstream corresponding to the data payload of an FBMC symbol, the insertion of pseudo guard sequences (711; 721), and two transmission chains (703, 704) comprising each:

- a precoder (730, 731) comprising a data reordering (712, 722), a Fourier Transform (713, 723) and a phase rotation (714, 724),
- a phase quadrature keying (512, 513), and
- an FBMC modulator (732, 733) comprising the upsampling and filtering of the symbols (551, 561) and an inverse Fourier transform (552, 562).

The second transmission chain further comprises delaying the samples that output the precoder by M/2 (514).

The output of the transmission chains are then combined by adder (540).

Figure 7D:
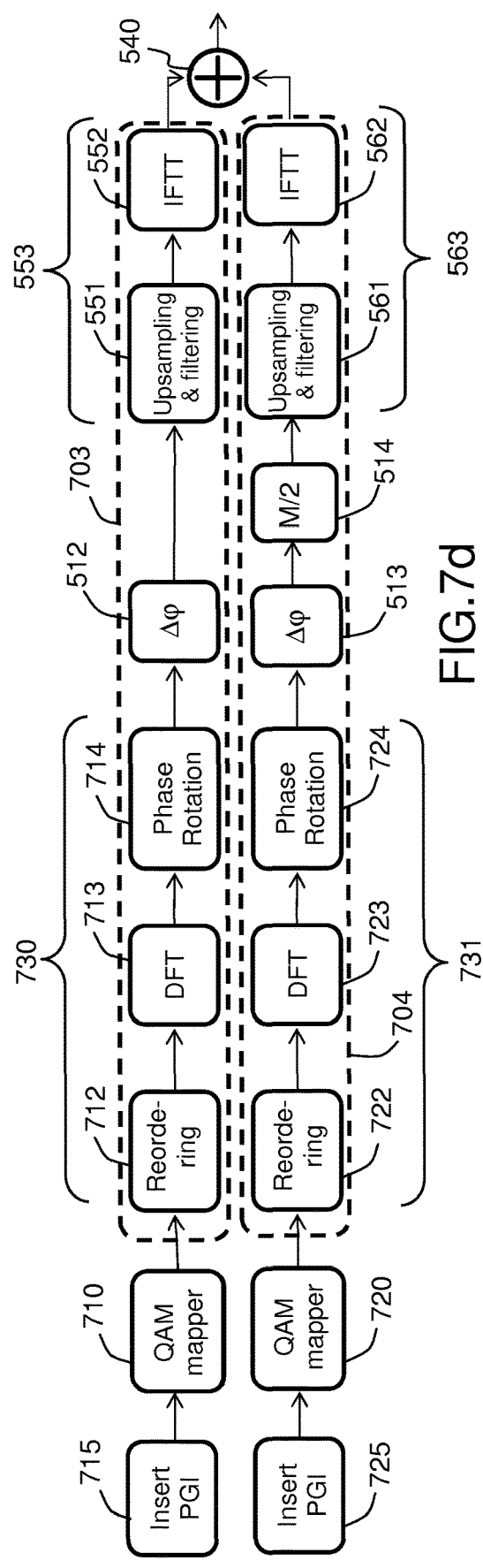

Likewise, FIG. 7d represents another embodiment of an FBMC/OQAM modulator according to the disclosure based on the FS-FBMC/OQAM modulator implementation, wherein the guard interval sequences are inserted (715, 725) prior to the QAM mapping (710, 720).

Thanks to the FBMC/OQAM modulator implementation according to the disclosure, some sequences may be inserted in the data without degrading the spectrum occupancy of the signal transmitted. They are inserted in a time domain representation of the signal, transposed into the frequency domain to be mapped over the subcarriers, and transposed back in the time domain by the final IFFT, which allows controlling their final shape. However, when the size of the precoding FFT and final IFFT are different, the guard intervals transmitted may slightly differ from the inserted in the precoding stage. For this reason, these sequences will be referred as pseudo guard intervals.

Figure 8:
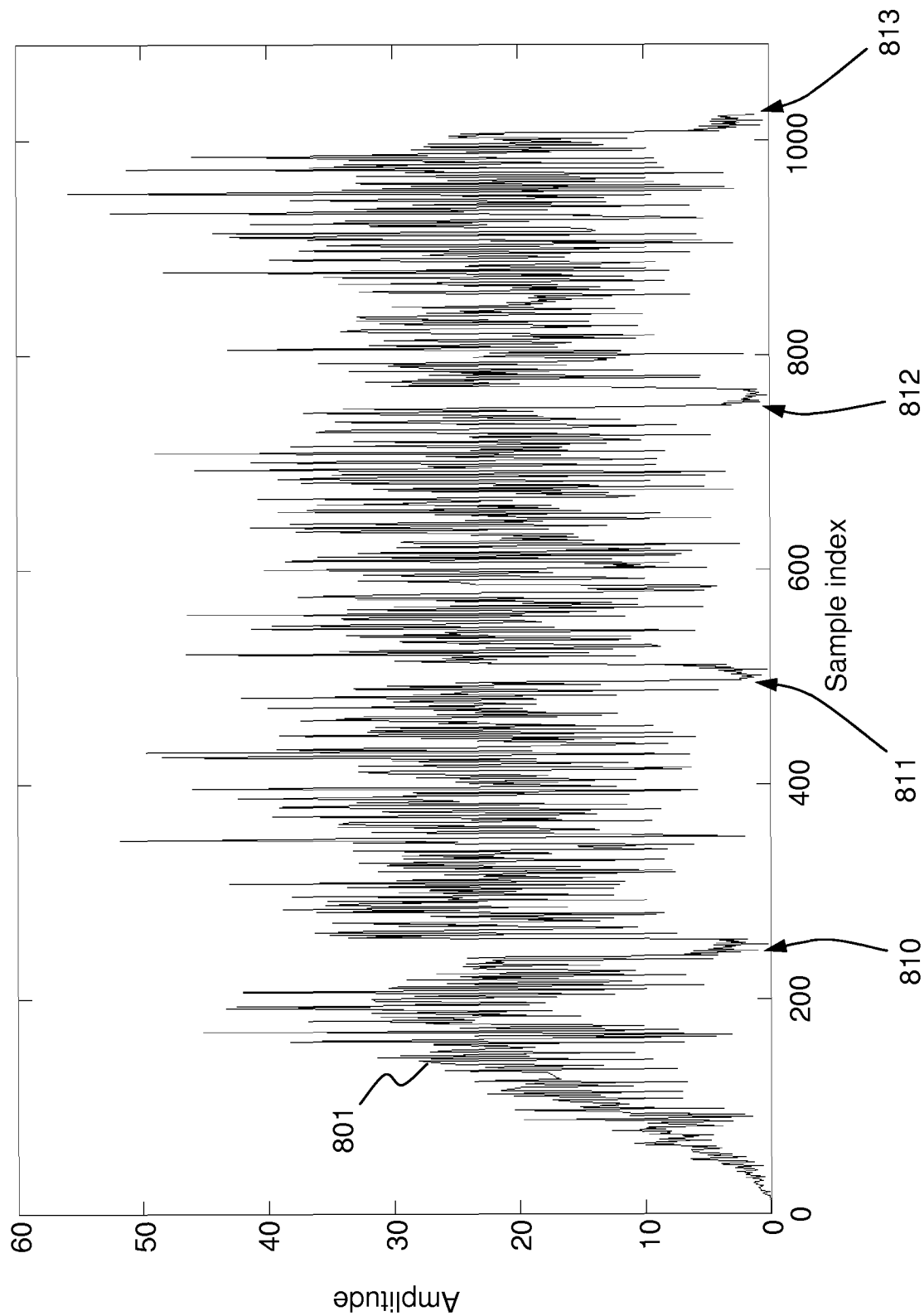
FIG. 8 is an exemplary illustration of an FBMC/OQAM signal transmitted by a symbol modulator according to the disclosure, FIG. 9 describes in more details the guard interval insertion in an FBMC/OQAM modulator according to one embodiment.

FIG. 8 is an exemplary illustration of an FBMC/OQAM signal emitted by a symbol modulator according to the disclosure, in which pseudo guard intervals are inserted. In this illustration is represented the emitted signal 801, modulated according to the following parameters: K=1, M=512, mapping=16 QAM, $L_{GI}$=10. The guard intervals sequences inserted in the time domain representation samples are null sequences, which make them easier to observe.

The pseudo guard sequences made of null sequences can be observed in 810, 811, 812 and 813. The modulated samples are not exactly null samples but are close to, limiting thus the intersymbol interferences, and making it possible to implement a low complexity frequency domain equalizer processing data free from intersymbol interferences in a receiver.

Figure 9:
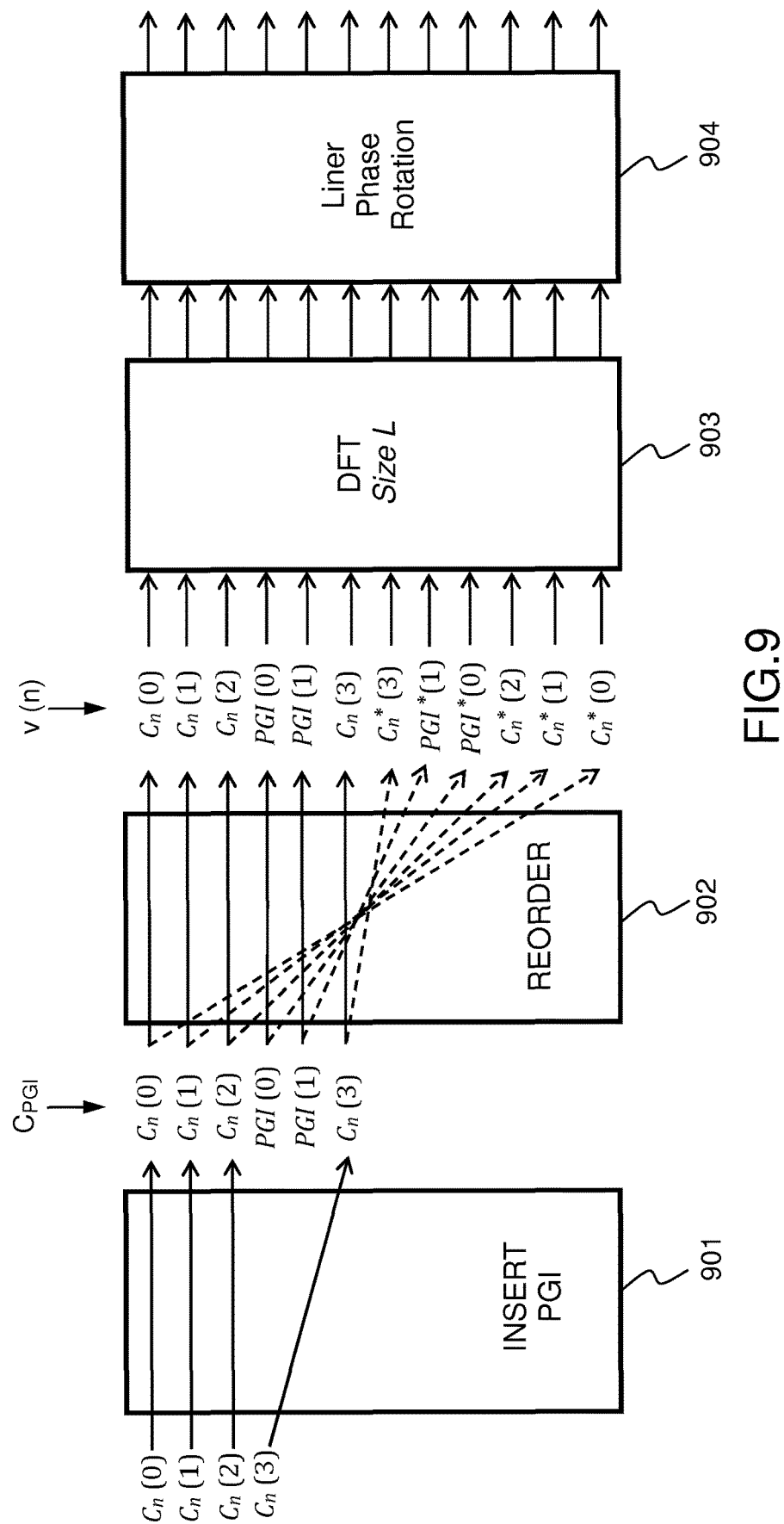

FIG. 9 describes in more details one embodiment of the disclosure, where the pseudo guard intervals are inserted in the complex symbols that input the precoder. The aim of the precoder is to generate real/imaginary symbols in a frequency domain representation from a time domain representation of samples. As described in FIGS. 7a and 7b, this is achieved through a Fourier transform 903, a symbol reordering 902 performed prior to the Fourier transform, and a linear phase rotation 904 performed after the Fourier transform. Thanks to the reordering and linear phase rotation stages, the samples that output the precoder are real samples in the frequency domain, and can be easily transform to comply with what is expected from the output of an OQAM mapper. They contain pseudo guard sequences inserted in the blocs of symbols, formatted so that they have the expected shape and position at the output of the FBMC modulator.

In this exemplary embodiment, the guard interval sequences are inserted after the QAM modulation, but the one skilled in transmitters would easily adapt it to use cases where the guard interval sequences are inserted by way of bit sequences added to the data bit stream that is input to the QAM mapper, as in FIGS. 7c and 7d. The position of the guard sequences, the sizes of the Fourier transform, and all other parameters are provided for illustrative purpose only, and may be easily adapted by a skilled person.

In the example of FIG. 9, the size N of the precoding DFT equals 12, while the length of the pseudo guard sequences is $L_{GI}$=2. As a result, the number N' of symbols to be mapped by the QAM mapper is of N/2−LSI=4. PGI (l) is the pseudo guard sequence at index $l \in [0, L_{GI}-1]$, and can be any complex valued sample, $c_n(i)$ is the symbol number t that outputs the QAM mapper, with $i \in [0, N'-1]$.

The first stage 901 relates to the pseudo guard intervals insertion into the blocs of N' symbols mapped by the QAM mapper. In order to appear just before the middle of the FBMC symbol transmitted, the guard interval samples shall be inserted just after the quarter of the bloc of N symbols. With $c_{PGI}(k)$ the symbol after the pseudo guard sequence insertion, $k \in [0, N/2-1]$, $c_{PGI}(k)$ follows the rule:

$$c_{PGI}(k) = \begin{cases} c_n(k), & k \in [0, N/4-1] \\ PGI(k-N/4), & k \in [N/4, N/4+L_{GI}-1] \\ c_n(k-L_{GI}), & k \in [N/4+L_{GI}, N/2-1] \end{cases} \quad (\text{Eq. 1})$$

When the pseudo guard sequences are inserted into the binary streams that are input to the QAM mappers, they must be positioned in a similar way, so that they appear just after the first quarter of the samples that output the QAM mapper.

The second stage 902 relates to the reordering of the symbols that are input to DFT 903. To this end, symbols $c_{PGI}(n)$ are duplicated. The duplicated symbols are flipped, that is to say that their order is inverted, and the complex conjugate of the flipped duplicated symbols are concatenated to the initial symbols $c_{PGI}(n)$. Thus, symbols v(l) that output the reordering stage, with $l \in [0, N-1]$, follow the rule:

$$v(l) = \begin{cases} c_{PGI}(l), & l \in [0, N/2-1] \\ c^*_{PGI}(N-l-1), & l \in [N/2, N-1] \end{cases} \quad (\text{Eq. 2})$$

The third stage 903 relates to the transposition of these symbols into a frequency domain representation, through a Fourier transform like a DFT or an FFT.

With X(k) the samples that output DFT 903:

$$X(k) = \sum_{l=0}^{N-1} v(l) e^{-i2\pi \frac{lk}{N}} \quad (\text{Eq. 3})$$

$$= \sum_{l=0}^{\frac{N}{2}-1} v(l) e^{-i2\pi \frac{lk}{N}} + (-1)^k \sum_{l=0}^{\frac{N}{2}-1} v\left(l+\frac{N}{2}\right) e^{-i2\pi \frac{lk}{N}}$$

$$= \sum_{l=0}^{\frac{N}{2}-1} c_{PGI}(l) e^{-i2\pi \frac{lk}{N}} + (-1)^l \sum_{j=0}^{\frac{N}{2}-1} c^*_{PGI}(l) e^{-i2\pi \frac{(\frac{N}{2}-l-1)k}{N}}$$

$$= \sum_{l=0}^{\frac{N}{2}-1} \left( c_{PGI}(l) e^{-i2\pi \frac{lk}{N}} + e^{i2\pi \frac{k}{N}} c^*_{PGI}(l) e^{i2\pi \frac{lk}{N}} \right)$$

In the fourth stage 904, a linear phase rotation of $$e^{-i\pi \frac{k}{N}}$$

is applied to the output of the Fourier transform, with $k \in [0, N-1]$. Samples Z(k) that output the phase shift rotator equal:

$$Z(k) = e^{-i\pi \frac{k}{N}} \sum_{l=0}^{\frac{N}{2}-1} \left( c_{PGI}(l) e^{-i2\pi \frac{lk}{N}} + e^{i2\pi \frac{k}{N}} c^*_{PGI}(l) e^{-i2\pi \frac{lk}{N}} \right) \quad (\text{Eq. 4})$$

$$= \sum_{l=0}^{\frac{N}{2}-1} \left( e^{-i\pi \frac{lk}{N}} c_{PGI}(l) e^{-i2\pi \frac{lk}{N}} + e^{i\pi \frac{k}{N}} c^*_{PGI}(l) e^{i2\pi \frac{lk}{N}} \right)$$

With $$w(k, l) = e^{-i\pi \frac{k}{N}} c_{PGI}(l) e^{-i2\pi \frac{lk}{N}},$$

it gives:

$$Z(k) = \sum_{j=0}^{\frac{N}{2}-1} (w(k, j) + w^*(k, j)) = 2 \sum_{j=0}^{\frac{N}{2}-1} \text{real}(w(k, j)) \quad (\text{Eq. 5})$$

Therefore, symbols Z(k) that output the linear phase shift rotator 904 are purely real. To make them purely imaginary, an additional phase shift of ±π/2 shall be added to each subcarrier.

It shall be noticed that, at step 901, the insertion of the pseudo guard sequences is done between sample N/4 and sample N/4+$L_{GI}$−1, so that, at the output of the linear phase rotator 714 and 724, they are positioned just before the middle of the symbols to modulate. This is due to the implementation of the pseudo guard insertion. Indeed, if N is set equal to M, to converge to a single-carrier setup, the mathematical expression of the signal y obtained at the output of the IFFT (before the polyphase filtering and upsampling in the implementation of FIG. 7a) is:

$$y(n) = \sum_{k=0}^{M-1} i^k \sum_{l=0}^{M-1} \left(v(l)e^{-i2\pi\frac{lk}{M}}\right)e^{i2\pi\frac{k(n-\frac{1}{2})}{M}} \quad \text{(Eq. 6)}$$

Equation (Eq. 6) can be equivalently rewritten as:

$$y\left(n - \frac{M}{4}\right) = Z(n) \circledast \sum_{k=0}^{M-1}\sum_{l=0}^{M-1}\left(v(l)e^{-i2\pi\frac{lk}{M}}\right)e^{i2\pi\frac{kn}{M}} \quad \text{(Eq. 7)}$$

$$y\left(n - \frac{M}{4}\right) = Z(n) \circledast v(n) \quad \text{(Eq. 8)}$$

where $\circledast$ denotes the circular convolution operator, and $Z(n)$ is the IFFT of the linear phase rotation term $$e^{-i\pi\frac{k}{M}}.$$

The absolute value of $Z(n)$ has a sampled sine cardinal shape. Therefore, the signal $y$ circularly shifted by $M/4$ samples corresponds to the symbols $v$ that output the reordering stage, which are convoluted by a sine cardinal. This convolution has the effect of "spreading" the symbols $v$, hence the "pseudo" insertion. However, this spreading effect does not change the symbol positions.

Therefore, $$y\left(\frac{M}{2} - L_{GI}\right) \text{ to } y\left(\frac{M}{2} - 1\right)$$

contains the pseudo sequence if it is transmitted from $$\hat{v}\left(\frac{M}{2} + \frac{M}{4} - L_{GI}\right) = c^*_{PGI}\left(\frac{M}{4} + L_{GI} - 1\right) = PGI*(L_{GI} - 1) \text{ to}$$

$$v\left(\frac{M}{2} + \frac{M}{4} - 1\right) = c^*_{PGI}\left(\frac{M}{4}\right) = PGI^*(0).$$

As a side effect, two pseudo sequences are inserted: one at the beginning of the FBMC symbol (hardly visible since this part is already attenuated by the prototype filter), and a second at the end of the first half of the FBMC symbol. When N<M, the spreading effect is increased, but the symbol positions remain unchanged.

FIGS. 10a and 10b represent two other exemplary embodiments of an FBMC/OQAM modulator according to the disclosure. In these embodiments, the precoding stage is ensured by way of a Direct Cosine Transform (DCT) 1012 and 1022. A DCT is a Fourier-related transform similar to the discrete Fourier transform, but using only real (or imaginary) numbers. Using a DCT is therefore another way to transpose a complex signal from the time domain to the frequency domain, which takes real (or imaginary) samples as inputs, and outputs real (or imaginary) samples. It is however less commonly used than a Direct or Fast Fourier transform as its implementation complexity is higher (due in particular to the fact that each DCT transform comprises the processing of two Fourier Transforms).

In these embodiments, the FBMC/OQAM modulator comprises a single QAM mapper 1001, to map a binary stream which size is of 2CN' bits. For instance, considering a 16QAM mapping, the size of the bit stream to map is of 8N'. In this embodiment, a first and a second set of symbols are formed, the first set from the real part of the complex symbols, and the second set from the imaginary part of the complex symbols. Guard intervals sequences are inserted (1011, 1021) into the first and second sets of symbols, the guard interval sequences being in the form of real, respectively imaginary, symbols. However, it would be obvious for the person skilled in the art to adapt the embodiment of these figures so that the guard sequences are inserted in the form of complex symbols into the complex symbols before the first and second sets of symbols are generated, or into the binary stream that is an input to the QAM mapper, as in FIGS. 10c and 10d.

The position to which samples of the guard interval sequences are inserted are the position expected in the FBMC symbol, that is to say in the interval [N/2+1, N/2+L_GI] for an oversampling factor of K=1.

A type-2 DCT of a real input vector $v$ can be computed using the following steps:
1) separate the even and the odd indexes of $v$, and concatenate the even part to the flipped odd part to obtain a new vector,
2) apply an FFT of size $N$ on this vector,
3) apply a linear phase rotation term $$2W(k) = 2e^{-i\pi\frac{k}{2N}},$$

and take the real part to obtain the DCT outputs.

In the embodiments of FIGS. 10a and 10b, a first (1002) and a second (1003) transmission chain respectively process the first and second sets of symbols comprising the guard interval sequences. In the first transmission chain, the real symbols set is processed by a precoding DCT 1012. Thus, the outputs $X(k)$ of the DCT 1012 can be expressed as follows:

$$X(k) = \text{real}\left(2e^{-i\pi\frac{k}{2N}}\sum_{l=0}^{N-1}v'(l)e^{-i2\pi\frac{lk}{N}}\right) = \quad \text{(Eq. 9)}$$

$$W(k)\sum_{l=0}^{N-1}v'(l)e^{-i2\pi\frac{lk}{N}} + W(k)^*\sum_{l=0}^{N-1}v'(l)e^{i2\pi\frac{lk}{N}}$$

with $v'(l) = \begin{cases} v(2l), l \in \left[0, \frac{N}{2} - 1\right] \\ v(2(N-l)-1), l \in \left[\frac{N}{2}, N-1\right] \end{cases}$ It should be noticed that in this specification, N is taken equal to M to simplify the demonstration, but the results are similar with N different of M. At the output of the IFFT 521 of the FBMC modulator:

$$y(n-N/4) = \text{IFFT}(W) \circledast v'(l) + \text{IFFT}(W^*) \circledast \text{IFFT}(\text{IFFT}(v')) \quad \text{(Eq. 10)}$$

A known relation is that $\text{IFFT}(x(l)) = \text{FFT}(x(N-l))$. Therefore, the above relation can be rewritten as:

$$y(n-N/4) = (\text{IFFT}(W) \circledast v'(l))(n) + (\text{IFFT}(W^*) \circledast v'(N-l))(n) \quad \text{(Eq. 11)}$$

The absolute values of IFFT(W) and IFFT(W*) both have a sampled sine cardinal shape. If this shape is approximated by an impulse (after 3 samples, the values are inferior to 10% of the peak when considering N=512), then we have:

$$y(n-N/4) \approx v'(n) + v'(N-n) \quad \text{(Eq. 12)}$$

Note that v'(N)=v'(0) due to the periodic properties of the IFFT. Therefore:

$$y(n-N/4) \approx \begin{cases} 2v(0), n = 0, \\ v(2n) + v(2n-1), n \in \left[1, \frac{N}{2}-1\right] \\ v(2(N-n)-1) + v(2(N-n)), n \in \left[\frac{N}{2}, N-1\right] \end{cases} \quad \text{(Eq. 13)}$$

If a null sequence is inserted at the interval $$\left[\frac{N}{2}+1, \frac{N}{2}+L_{GI}\right]$$

and assuming that $L_{GI}$<N/4 (which is a realistic hypothesis), then $$y\left(\frac{N}{2}-1\right) \approx v\left(\frac{N}{2}+1\right) + v\left(\frac{N}{2}+2\right) \approx 0 \text{ and}$$

$$y\left(\frac{N-L_{GI}}{2}\right) \approx v\left(\frac{N}{2}+L_{GI}-1\right) + v\left(\frac{N}{2}+L_{GI}\right) \approx 0,$$

showing that the null sequence is inserted at the end of the first half of the FBMC symbol.

Samples that are output to DCT 1012 are therefore a frequency domain representation of real samples.

Similarly, the set of imaginary symbols that are input to precoder 1031 of the second transmission chain 1003, comprising the guard interval sequences, are processed by a Direct Cosine Transform 1022 configured to process imaginary symbols. The samples that output precoder 1031 of the second transmission chain are a frequency domain representation of imaginary samples.

The real/imaginary samples that output the precoding stage of the first/second transmission chain are then processed by respective FBMC modulators 523 and 533, or 553 and 563, which output are summed after delaying the output of the second transmission chain by M/2 (514), as required for an OQAM mapping.

In the embodiment of FIG. 10*b,* the first and second-transmission chains (1004, 1005) perform a FBMC modulation considering a FS structure.

Figure 10C:
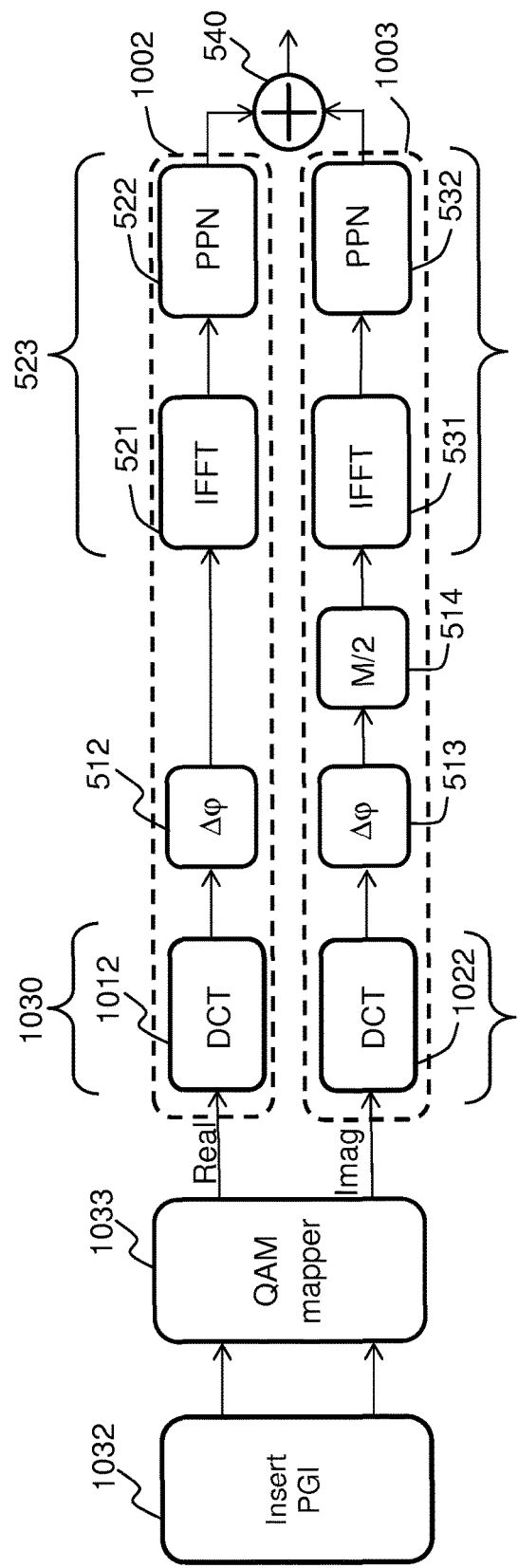
Figure 10D:
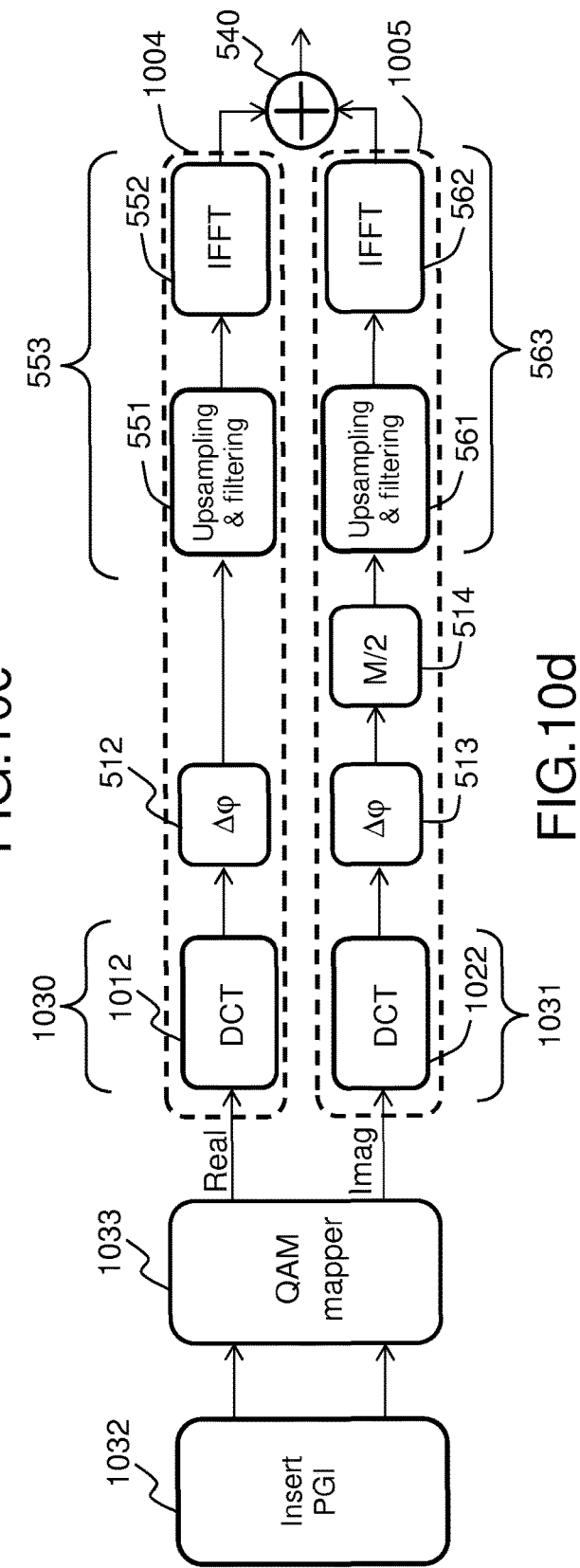

FIGS. 10*c* and 10*d* illustrate two other embodiments, in which the guard interval insertion 1032 is performed prior to the QAM mapper 1033.

The FBMC/OQAM modulator disclosed is intended to be implemented in a radio transmitter, and may be implemented over multiple software architectures.

Figure 11:
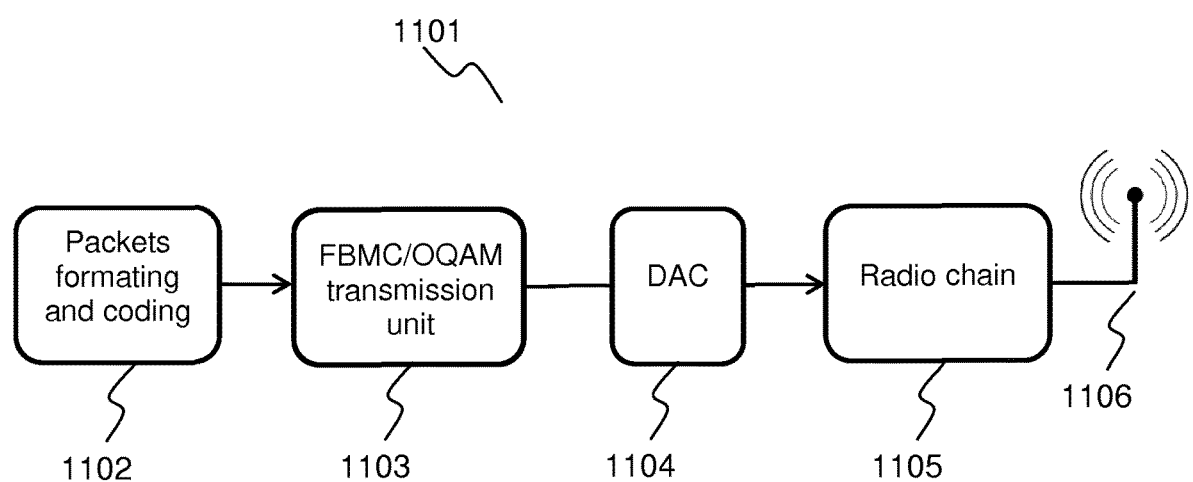
FIG. 11 is a schematic representation of a transmitter comprising an FBMC/OQAM modulator according to the disclosure.

FIG. 11 is a schematic representation of a transmitter comprising an FBMC/OQAM modulator as disclosed. The representation is limited to the OSI (Open Systems Interconnection) physical layer processing, considering that the transmitter retrieves binary input data from upper communication layers (media access control layer). The transmitter 1101 comprises the software resources 1102 required to format the data packets to transmit considering the transmission parameters (based on various information as for instance the throughput required, the link budget required, the propagation channel conditions, etc . . . ). Among other, the processing performed by these software resources may comprise data error coding, checksum insertion, or the like.

The transmitter further comprises an FBMC/OQAM modulator 1103 according to any embodiment of the disclosure, to modulate the binary streams delivered by resources 1102 into an FBMC/OQAM baseband or intermediate frequency signal. The modulated signal comes in the form of a series of complex symbols. When the oversampling factor K of the FBMC/OQAM scheme implemented is greater than one, the transmitter shall comprise K iterations of an FBMC/OQAM modulator according to the disclosure, to modulate respective binary stream, the output of the FBMC/OQAM modulators being summed to perform an overlapping function. The transmitter may further comprise a digital-to-analog converter 1104, to oversample and convert the series of complex symbols into an analog signal, which is then processed by a radio chain 1105, in charge of converting the signal to the carrier frequency, and amplify it, before sending it to an RF antenna 1106.

The FBMC/OQAM modulator according to any embodiment of the disclosure may also be embedded as a stand-alone device configured to take as input a binary stream, and to provide a baseband or intermediate frequency FBMC/OQAM signal to transmit to another reception device performing the subsequent steps of analog conversion, radio processing and transmitting.

Among the various possible implementations of the FBMC/OQAM modulator 1103 according to the disclosure, the various processing required (QAM mappers, Fourier and inverse Fourier transforms, oversamplers, prototype filters, etc . . . ) may be implemented by way of one or many calculation machines such as software reprogrammable calculation machines (microprocessor, microcontroller, digital signal processor (DSP), graphics processing unit (GPU), . . . ), dedicated calculation machines (Field Programmable Gate Array (FPGA), Application Specific Integrated Circuit (ASIC), . . . ), a combination thereof, or any other appropriate equipment.

It can also be implemented by means of computer-application programs or services, as an application-programming interface (API), a library, and/or other computer-program product, or any combination of such entities.

The FBMC/OQAM modulator according to the disclosure comprises two transmission chains, each transmission chain comprising a precoder, a phase rotator, and a FBMC transmitter. Of course, it would be obvious for the person skilled to perform the required calculation from only one transmission chain processing data at twice the bit rate, and/or to use a single precoder and/or to share some resources between both transmission chains.

The subject matter of the present disclosure includes all novel and non-obvious combinations and sub-combinations of the various processes, systems and configurations, and other features, functions, acts, and/or properties disclosed herein, as well as any and all equivalents thereof.

The FBMC/OQAM modulator disclosed allows modulating FBMC symbols comprising guard interval sequences in a way that these sequences are very close to the sequences expected once modulated. This introduces cyclostationarity in the signal, which eases the implementation of an equalizer on the receiver side and improves its performance. As the guard intervals are inserted in the FBMC modulator before the FBMC modulation itself, it does not affect the spectrum shape of the FBMC modulation. The length of the guard intervals may be adapted dynamically to the channel propagation conditions, by adjusting the number of useful bits transmitted, without modifying the waveform and its parameters, contrary to OFDM wherein changing the length of the cyclic prefixes requires modifying the waveform (in particular the symbol duration) and is therefore generally limited to a couple of cyclic prefixes lengths.

The FBMC/OQAM signal transmitted by a device according to the disclosure complies with short prototype filters, and keeps all the properties that make the FBMC/OQAM modulation scheme a good candidate for standardization in 5G telecommunication standards:
Low latency,
Low out of band emissions,
Flexibility (multiple schemes may be implemented by modifying various parameters, like the order of the QAM modulation, the number of subcarriers, the oversampling factor and size of the prototype filter, the size of the guard interval sequences, . . . ).

In addition to an FBMC/OQAM modulator unit and a transmitter comprising said modulator unit, the disclosure further addresses the corresponding method, to insert guard intervals into an FBMC/OQAM transmission.

Figure 12A:
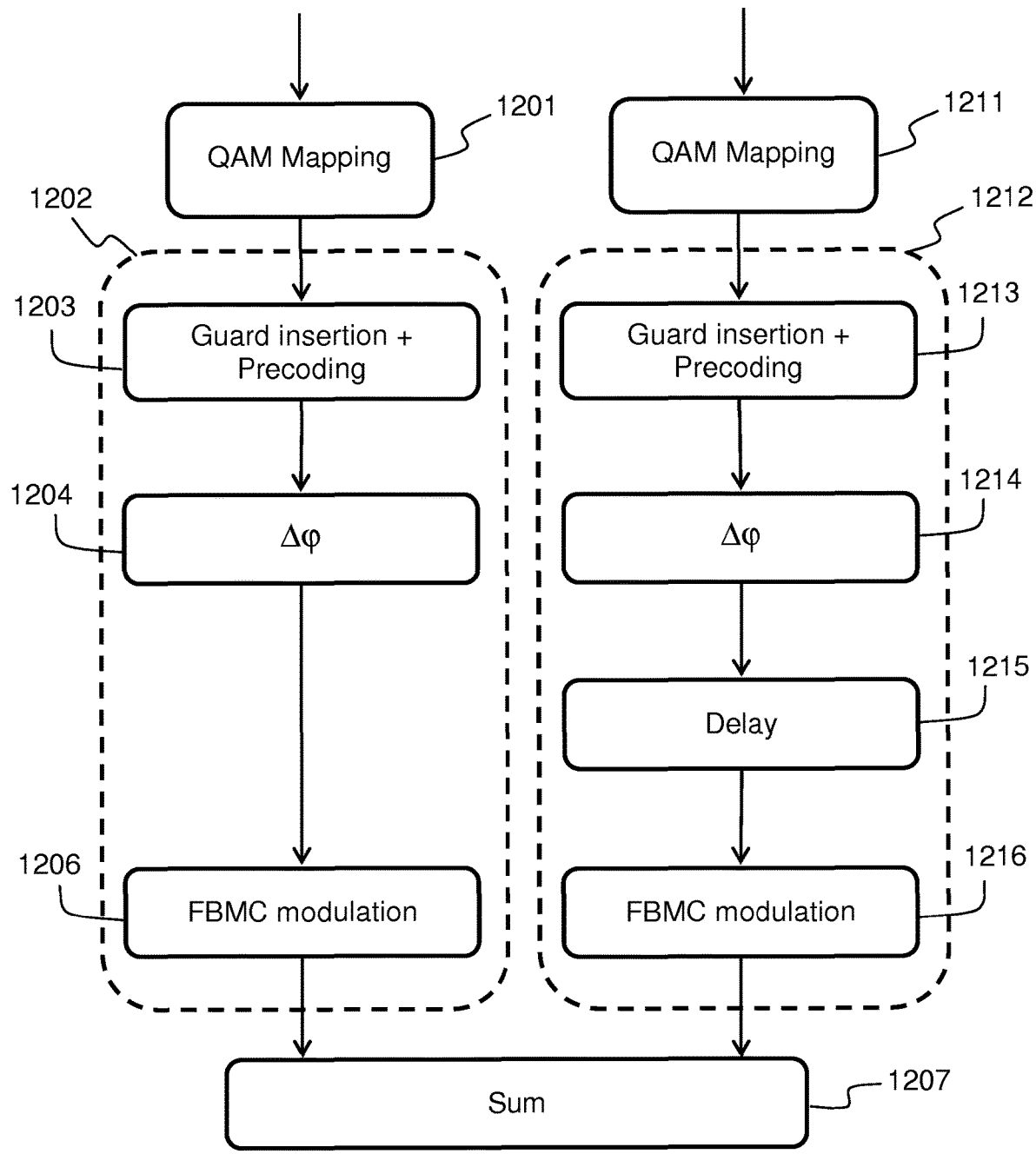
FIGS. 12a and 12b show two exemplary embodiments of a method according to the disclosure to modulate an FBMC/OQAM signal comprising guard interval sequences.
Figure 12B:
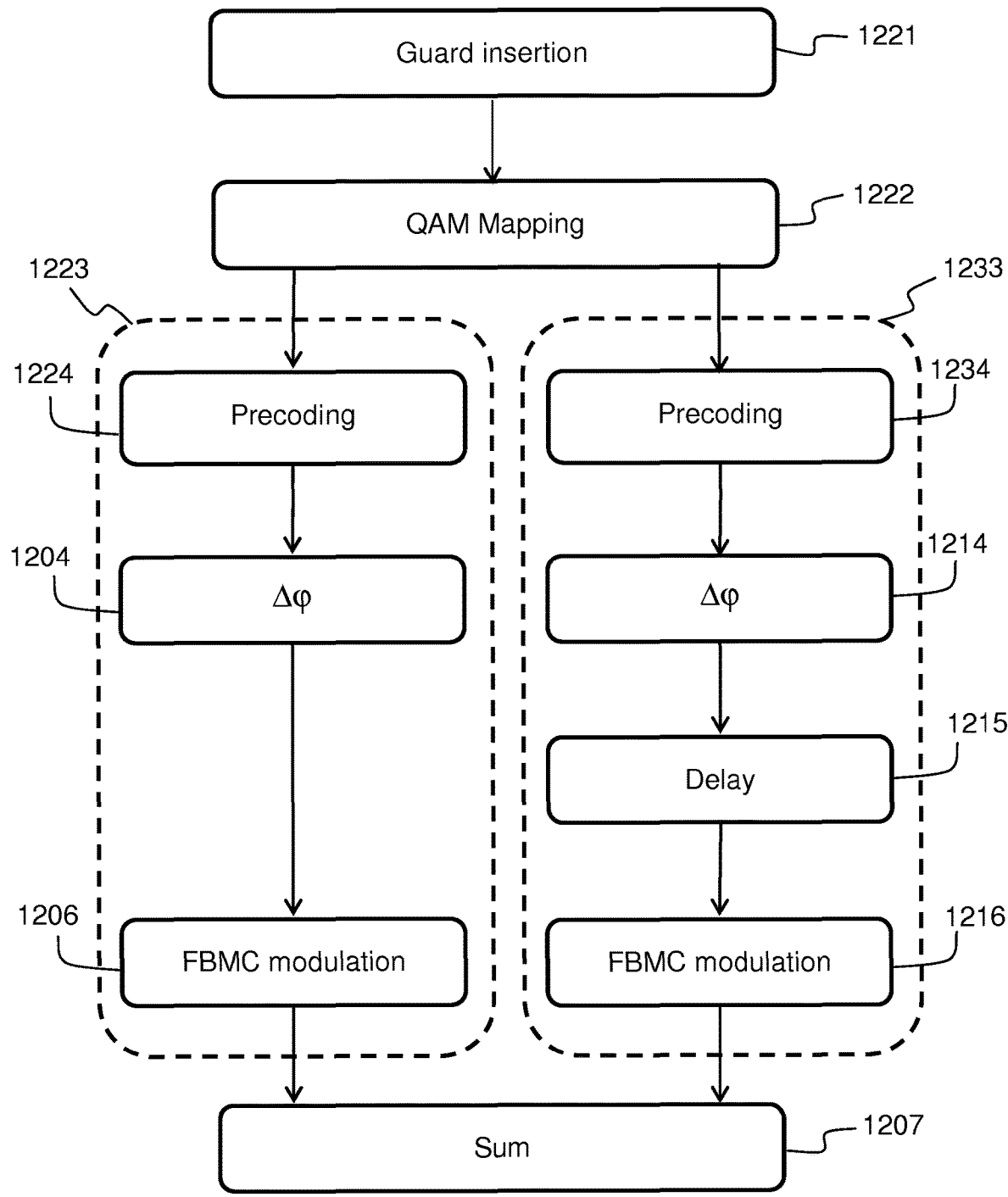

FIGS. 12a and 12b are different embodiments of a method according to the disclosure, to modulate an FBMC/OQAM signal comprising guard interval sequences.

FIG. 12a relates to the modulators as described in the embodiments of FIGS. 7a to 7d. The first step of the method consists in performing a QAM modulation over a binary stream of a size depending on the QAM modulation order C in order to modulate 2N' complex symbols in a time domain representation. This step may be achieved indifferently by way of a single QAM modulation processing, in order to generate a stream of QAM symbols of a size 2N' that is then split in two parts, or by way of two QAM modulation processing (1201, 1211) generating each a stream of N' QAM symbols from respective half of the binary stream to transmit.

The two blocs of QAM symbols of a size N' are respectively processed by a first processing chain 1202 and a second processing chain 1212. Each chain comprises in sequence, performing:
a step (1203, 1213) of inserting guard interval sequences into and precoding the time domain representation of the QAM symbols, in order to respectively obtain real and imaginary samples in a frequency domain representation in the first and second processing chains. To this end, the precoding comprises reordering the symbols comprising the guard interval sequences, i.e. concatenating them with a flipped and conjugated version of these symbols, as described in FIG. 9. The steps of pseudo guard insertion and reordering may be processed in any order. The precoding further comprises performing a Fourier transform (or an inverse Fourier transform) over the reordered samples, as well as a linear phase rotation of $$e^{-i\pi \frac{k}{N}},$$

with k tne index or the samples, k∈[0,N−1]. As a result of the reordering, Fourier transform, and linear phase rotation, the output of the precoder are real samples. An additional phase rotation of $$e^{-i\frac{\pi}{2}} \text{ or } e^{i\frac{\pi}{2}}$$

is applied to the samples of the second transmission chain, to obtain imaginary samples;

a step (1204, 1214) of applying a π/2 phase quadrature keying to one sample over two to the samples that output the precoders, wherein the samples of the second processing chain to which the phase shift keying is applied correspond to the samples of the first processing chain to which the phase shift keying is not applied, as it is well known from existing OQAM modulators;
a step (1215) of delaying the samples of the second processing chain by M/2 samples, M being the total number of subcarriers allocated to the transmission. This step may be indifferently processed at any stage of the second processing chain;
a step (1206, 1216) of performing an FBMC modulation over the samples that output the phase shift keying and/or delay line. This step may be achieved for instance through an IFFT followed by a polyphase network, or through an upsampling and filtering of the samples, followed by an IFFT.

The last step of the method according to one embodiment consists in summing (1207) the output of the two processing chains to form an FBMC/OQAM signal. In case the oversampling factor K of the modulation is greater than one, this signal overlaps with the signal modulated with regard to 2K−1 other FBMC symbols.

In an alternate embodiment of a method object of the disclosure, represented in FIG. 12b and corresponding to FIGS. 7c and 7d, the guard interval sequences are inserted (1221) into the binary stream that is processed by the QAM mapping (1222) stage. In that case, the QAM mapping is done over CN bits, which are then separated into two streams of N/2 complex samples respectively transmitted to the first and second processing chains. Alternately, the binary streams may be split in two respective binary streams of a size CN/2, guard interval sequences being inserted in each stream, to which QAM mapping are respectively applied in order to generate N/2 QAM symbols that feed the first and second processing chains.

FIG. 12b also illustrates another embodiment of a method according to the disclosure, corresponding to the FBMC/OQAM modulator described in FIGS. 10c to 10d.

In this embodiment, the method comprises the steps of:
inserting (1221) guard sequences into a binary stream to modulate of a size CN' bits;
processing a QAM mapping (1222) over the binary stream comprising the guard sequences;
processing the real part of the N symbols that output the QAM mapping stage through a first (1223) processing chain, and the imaginary part of the N symbols through a second (1233) processing chain;
summing (1207) the output of the first and second processing chains.

The processing of the real/imaginary symbols that output the QAM mapping in the first and second processing chains comprises:
a step of precoding (1224, 1234) the real/imaginary symbols, the precoding comprising performing a Direct Cosine Transform,
a step (1204, 1214) of applying a π/2 phase quadrature keying to one sample over two over the samples computed in the step of precoding,
a step (1215) of delaying the samples of the second processing chain by M/2 samples, and
a step (1206, 1216) of performing an FBMC modulation over the samples that output the phase shift keying and/or delay line.

The steps of guard interval sequences insertion and QAM mapping may be inverted. In that case, the samples corresponding to the guard sequences are inserted in the time domain representation of samples transmitted to the precoders of the first and second processing chain, and the QAM mapping is processed over CN bits.

The method according to any embodiment of the disclosure may be implemented over multiple software architectures, in particular by means of computer-application programs or services, as an application-programming interface (API), a library, and/or other computer-program product, or any combination of such entities. It may take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

While embodiments of the disclosure have been illustrated by a description of various examples, and while these embodiments have been described in considerable details, it is not the intent of the applicant to restrict or in any way limit the scope of the appended claims to such details. The disclosure in its broader aspects is therefore not limited to the specific details, representative methods, and illustrative examples shown and described.

The invention claimed is:

1. An FBMC/OQAM modulator, to modulate an FBMC/OQAM signal from a binary stream, the FBMC/OQAM modulator comprising at least one QAM mapper to map said binary stream into at least one time domain representation of complex symbols, a first transmission chain and a second transmission chain, each transmission chain comprising:
   a precoder configured to transpose a first, and respectively a second, set of symbols obtained from the said complex symbols into a frequency domain representation of real, respectively imaginary, samples,
   a phase rotator configured to apply a phase quadrature keying to the samples that output the decoder, and
   an FBMC modulator configured to modulate the output of the phase rotator into a time domain representation of an FBMC symbol, the FBMC/OQAM modulator further comprising an adder to sum the output of the first transmission chain with a delayed version of the output of the second transmission chain, wherein the FBMC/OQAM modulator is further configured to insert guard interval sequences into the binary stream that input the QAM mapper, or into the symbols in the time domain representation processed by the precoders.

2. The FBMC/OQAM modulator of claim 1, wherein the first and second sets of symbols are made of distinct symbols from the said complex symbols that are output to the QAM mapper, and wherein the precoders of the first and second transmission chains are configured to process respectively the first and second sets of symbols by at least:
   reordering the set of symbols by concatenating to said set of symbols a flipped version of the complex conjugate of the set of symbols,
   performing a Fourier transform over the reordered symbols, and
   applying a $$e^{-i\pi \frac{k}{N}}$$

linear phase shift to the samples that output the Fourier transform, where N is the number of samples that output the Fourier transform, and k is the index of the sample to which the phase rotation is applied.

3. The FBMC/OQAM modulator of claim 1, wherein the first, and respectively second, set of symbols is made of the real, and respectively imaginary, part of the said complex symbols that are output to the QAM mapper, and wherein the precoder of the first transmission chain and the precoder of the second transmission chain are configured to perform a Direct Cosine transform over the respective sets of symbols.

4. The FBMC/OQAM modulator of claim 1, wherein the FBMC modulator of the first and second transmission chains are configured to modulate a time domain representation of an FBMC symbol from samples in a frequency domain representation by performing at least:
   an oversampling, by a factor K greater or equal than one,
   a filtering by a prototype filter, and
   an inverse Fourier transform.

5. The FBMC/OQAM modulator of claim 1, wherein an oversampling factor K of the FBMC modulation is greater than one, and wherein the FBMC/OQAM signal modulated overlaps with K−1 other FBMC/OQAM signals.

6. The FBMC/OQAM modulator of claim 1, wherein the guard interval sequences are inserted so as to be positioned over samples comprising samples situated substantially at the end of the first half of FBMC symbols generated by the FBMC modulators.

7. The FBMC/OQAM modulator of claim 1, wherein the guard interval sequences are null sequences.

8. A radio communication equipment comprising at least one FBMC/OQAM modulator according to claim 1.

9. A method, to modulate an FBMC/OQAM signal from a binary stream, comprising the steps of:
   performing a QAM mapping of said binary stream, to obtain a time domain representation of complex symbols,
   computing a first and a second set of symbols from the said complex symbols,
   processing the first set of symbols by a first processing chain and the second set of symbols by a second processing chain, wherein each processing comprises:
   precoding the set of symbols to transpose it into a frequency domain representation of real, respectively imaginary, samples,
   applying a phase quadrature keying to the frequency domain representation of samples,
   applying an FBMC modulation to the rotated frequency domain representation of complex samples,
   delaying the samples of the second processing chain,
   summing the output of the first processing chain with the output of the second processing chain,
   the method further comprising a step of inserting guard interval sequences into the binary stream or into the symbols in the time domain representation that are processed by the precoders.

10. A non-transitory computer readable storage medium storing a computer program comprising instructions, when executed by a processor, to implement the method of claim 9.

* * * * *